(12) United States Patent
Guyvoronskiy et al.

(10) Patent No.: US 9,615,668 B2
(45) Date of Patent: Apr. 11, 2017

(54) BALANCING MECHANISM FOR A WALL BED

(71) Applicants: Valeriy Guyvoronskiy, Concord (CA); Gennadiy Lisnyak, Richmond Hill (CA)

(72) Inventors: Valeriy Guyvoronskiy, Concord (CA); Gennadiy Lisnyak, Richmond Hill (CA)

( * ) Notice: Subject to any disclaimer, the term of this patent is extended or adjusted under 35 U.S.C. 154(b) by 192 days.

(21) Appl. No.: 14/430,845

(22) PCT Filed: Sep. 24, 2013

(86) PCT No.: PCT/CA2013/000807
§ 371 (c)(1),
(2) Date: Mar. 24, 2015

(87) PCT Pub. No.: WO2014/043797
PCT Pub. Date: Mar. 27, 2014

(65) Prior Publication Data
US 2015/0230620 A1    Aug. 20, 2015

Related U.S. Application Data

(60) Provisional application No. 61/704,673, filed on Sep. 24, 2012.

(51) Int. Cl.
*A47C 17/52* (2006.01)
*A47C 17/40* (2006.01)

(52) U.S. Cl.
CPC .............. *A47C 17/40* (2013.01); *A47C 17/52* (2013.01)

(58) Field of Classification Search
CPC .......... A47C 17/38; A47C 17/40; A47C 17/52

USPC ................................ 5/133, 159.1, 164.1, 136
See application file for complete search history.

(56) References Cited

U.S. PATENT DOCUMENTS

| | | | |
|---|---|---|---|
| 2,577,223 | A | 12/1951 | Woller |
| 4,337,670 | A | 7/1982 | Carlson |
| 4,449,263 | A | 5/1984 | Wilson et al. |
| 4,885,813 | A | 12/1989 | McNamara |
| 5,033,134 | A | 7/1991 | Burchett |
| 5,446,932 | A | 9/1995 | Voorhis |

(Continued)

FOREIGN PATENT DOCUMENTS

| EP | 2404528 A1 | 1/2012 |
|---|---|---|
| WO | 2013101298 A1 | 7/2013 |

OTHER PUBLICATIONS

U.S. Appl. No. 14/430,843, filed Mar. 24, 2015, Notice of Allowance mailed Aug. 7, 2015.

(Continued)

*Primary Examiner* — Fredrick Conley
(74) *Attorney, Agent, or Firm* — Kunzler Law Group

(57) ABSTRACT

An apparatus includes a fixed plate 902 mounted in a bed cabinet 108 and a rotating plate 904, mounted to a bed frame 106, coupled to the fixed plate 902 at a pivot point 906. A first end of a first lever arm 918 is coupled to the fixed plate 902. A first end of a second lever arm 920 is coupled to the first lever arm at a point between the first end and the second end of the first lever arm 918. The second end of the second lever arm 920 is coupled to the rotating plate 904 at a position that is offset a horizontal distance from the pivot point 906. A first end of a gas spring 908 is coupled to the fixed plate 902 and the second end of the gas spring 908 is coupled to the second end of the first lever arm 918.

20 Claims, 13 Drawing Sheets

(56) References Cited

U.S. PATENT DOCUMENTS

| | | | |
|---|---|---|---|
| 5,652,978 | A | 8/1997 | Wiig |
| 5,943,718 | A | 8/1999 | Krauter |
| 6,105,185 | A | 8/2000 | DiRocco |
| 6,185,764 | B1 | 2/2001 | Merritt |
| 7,793,366 | B2 | 9/2010 | Stoltzfus |
| 7,823,231 | B2 | 11/2010 | Paoutoff |
| 7,937,787 | B2 | 5/2011 | Whitford |
| 8,006,327 | B1 | 8/2011 | Burchett |
| 8,800,077 | B2 | 8/2014 | Colombo |
| 2008/0163422 | A1 | 7/2008 | Paoutoff |
| 2012/0060279 | A1 | 3/2012 | Colombo |

OTHER PUBLICATIONS

PCT/CA2013/000806 International Search Report and Written Opinion mailed Jan. 24, 2014.
PCT/CA2013/000807 International Search Report and Written Opinion mailed Jan. 22, 2014.
TiMOTION 2014 Auto Motion Products Overview, Updated Aug. 2014.
TiMOTION Heavy Duty Linear Actuation Systems for Demanding Industrial Applications, http://www.timotion.tw/, Retrieved Mar. 24, 2015.

BALANCING MECHANISM FOR A WALL BED

CROSS-REFERENCES TO RELATED APPLICATIONS

This application claims the benefit of U.S. Provisional Patent Application No. 61/704,673 entitled "ELECTRIC WALL BED AND LEG EXTENDER" and filed on Sep. 24, 2012 for Valeriy Guyvoronskiy, et al., which is incorporated herein by reference.

FIELD

This invention relates to wall beds and more particularly relates to a mechanism to extend legs of a wall bed.

BACKGROUND

Beds tend to take a lot of space in a room, even though they are not used during non-sleep hours. In many locations, such as apartments, mobile homes, etc., space is a premium and it is desirable to conserve space where possible. Wall beds are a solution to space savings. A wall bed is a bed that fits in a bed cabinet in a vertical position during non-sleep hours and that can be lowered to a horizontal position for sleeping, thus allowing space under where a bed would fit to be used for other purposes during non-sleep hours.

One challenge with wall beds is the weight of the bed frame, a mattress, bedding, a façade on the underside of the bed that mates with the wall, etc. Wall beds are often connected to a bed cabinet at a pivot point and the bed rotates from the vertical position to the horizontal position around the pivot point. As the wall bed is lowered, gravitational forces on the wall bed assembly can become very significant and can cause injury if the wall bed is lowered too fast.

Wall beds often have one or more legs that extend from the bed frame to the floor when the wall bed is in the horizontal position. The bed legs provide support so that the wall bed will support the weight of the wall bed and one or more users. It is desirable to hide the bed legs when the wall bed is in the vertical position.

SUMMARY

A bed moving apparatus is disclosed. A system also performs the functions of the apparatus. The bed moving apparatus includes a fixed plate mounted on a vertical wall of a bed cabinet and a rotating plate rotatably coupled to the fixed plate at a first pivot point. The rotating plate is mounted to a bed frame. When the bed frame is in a vertical position the rotating plate is approximately parallel to the fixed plate, and when the bed frame is in a horizontal position the rotating plate is approximately perpendicular to the fixed plate. The bed moving apparatus includes a first lever arm with a first end and a second end. The first end of the first lever arm is rotatably coupled to the fixed plate. The bed moving apparatus includes a second lever arm with a first and a second end. The first end of the second lever arm is rotatably coupled to the first lever arm at a point between the first end and the second end of the first lever arm, and the second end of the second lever arm is rotatably coupled to the rotating plate at a position that is offset a first horizontal distance from the first pivot point. The bed moving apparatus includes a gas spring with a first end and a second end. The first end of the gas spring is rotatably coupled to the fixed plate and the second end of the gas spring is rotatably coupled to the second end of the first lever arm. The gas spring opposes a gravitational force acting on the bed frame as the bed frame moves from the horizontal position to the vertical position.

In one embodiment, the apparatus includes an electrically activated linear actuator with a first end and a second end. The first end of the linear actuator is rotatably coupled to the fixed plate, and the second end of the linear actuator is rotatably coupled to the rotating plate. The electrically activated linear actuator includes a housing and a piston within the housing that extends outward from the housing as the bed frame moves to the horizontal position, and that contracts into the housing as the bed frame moves to the vertical position. In another embodiment, the second end of the linear actuator is connected to the rotating plate at a position that is horizontally offset from the first pivot point at a location such that the second end of the second lever arm is attached to the rotating plate between the location that the second end of the linear actuator is connected to the rotating plate and the first pivot point.

In another embodiment, the first end of the linear actuator is connected to the fixed plate at a position that is horizontally offset from a vertical line extending through the first pivot point at a location such that the first end of the gas spring is attached to the fixed plate between the location that the first end of the linear actuator is connected to the fixed plate and the vertical line. In another embodiment, the second end of the linear actuator is connected to the rotating plate at a location vertically offset from a horizontal line running along the bed frame and through the first pivot point when the bed frame is in the horizontal position. In another embodiment, the linear actuator includes a worm gear that moves the piston in and out of the housing of the linear actuator. In another embodiment, the linear actuator includes a reversible electric motor that moves the piston of the linear actuator. The electric motor operates in a first direction moves the bed frame to the horizontal position and operates in a second direction moves the bed frame to the vertical position.

In one embodiment, the second lever arm is coupled to the first lever arm at a second pivot point. The second pivot point is offset such that the second pivot point is between a center of the first lever arm and the second end of the first lever arm. In another embodiment, the second lever arm is less than half the length of the first lever arm. In another embodiment, the length of the first lever arm, the length of the second lever arm, and a second pivot point where the first end of the second lever arm is coupled to the first lever arm are chosen to provide an upward force between a vertical position and a position of about 15 degrees from vertical, a substantially balanced force between about 15 degrees from vertical to about 80 degrees from vertical, and a downward force between about 80 degrees from vertical to the horizontal position.

In one embodiment, the first end of the first lever arm is rotatably coupled to the fixed plate at a first distance from the first pivot point. In another embodiment, the first end of the gas spring is rotatably coupled to the fixed plate at a third pivot point and the third pivot point positioned a vertical distance above the first pivot point.

Another bed moving apparatus includes a fixed plate mounted on a vertical wall of a bed cabinet and a rotating plate rotatably coupled to the fixed plate at a first pivot point. The rotating plate is mounted to a bed frame. When the bed frame is in a vertical position the rotating plate is approximately parallel to the fixed plate, and when the bed frame is in a horizontal position the rotating plate is approximately perpendicular to the fixed plate. The bed moving apparatus includes a gas spring with a first end and a second end. The first end of the gas spring is rotatably coupled to the fixed plate, and the second end of the gas spring is rotatably coupled to the rotating plate. The gas spring opposes a gravitational force acting on the bed frame as the bed frame moves from the horizontal position to the vertical position. The bed moving apparatus includes an electrically activated linear actuator with a first end and a second end. The first end of the linear actuator is rotatably coupled to the fixed plate and the second end of the linear actuator is rotatably coupled to the rotating plate. The electrically activated linear actuator includes a housing and a piston within the housing that extends outward from the housing as the bed frame moves to a vertical position, and that contracts into the housing as the bed frame moves to a horizontal position.

In one embodiment, the gas spring is positioned approximately parallel to the linear actuator. In another embodiment, the bed moving apparatus includes a first lever arm with a first end and a second end. The first end of the first lever arm is rotatably coupled to the fixed plate. In the embodiment, the bed moving apparatus includes a second lever arm with a first and a second end. The first end of the second lever arm is rotatably coupled to the first lever arm at a point between the first end and the second end of the first lever arm, and the second end of the second lever arm is rotatably coupled to the rotating plate at a position that is offset a first horizontal distance from the first pivot point. The second end of the gas spring is rotatably coupled to the second end of the first lever arm.

In another embodiment, the second end of the linear actuator is connected to the rotating plate at a position that is horizontally offset from the first pivot point at a location such that the second end of the second lever arm is attached to the rotating plate between the location that the second end of the linear actuator is connected to the rotating plate and the first pivot point. In another embodiment, the first end of the linear actuator is connected to the fixed plate at a position that is horizontally offset from a vertical line extending through the pivot point at a location such that the first end of the gas spring is attached to the fixed plate between the location that the first end of the linear actuator is connected to the fixed plate and the vertical line. In another embodiment, the linear actuator includes a worm gear that moves the piston in and out of the housing of the linear actuator and the linear actuator includes a reversible electric motor that moves the piston of the linear actuator. The electric motor operates in a first direction moving the bed frame to the horizontal position and operating in a second direction moving the bed frame to the vertical position.

A bed moving system includes a bed cabinet for a wall bed, a bed frame of the wall bed, and a fixed plate mounted on a vertical wall of the bed cabinet. The bed moving system includes a rotating plate rotatably coupled to the fixed plate at a first pivot point. The rotating plate is mounted to the bed frame. When the bed frame is in a vertical position the rotating plate is approximately parallel to the fixed plate. When the bed frame is in a horizontal position the rotating plate is approximately perpendicular to the fixed plate. The bed moving system includes a first lever arm with a first end and a second end. The first end of the first lever arm is rotatably coupled to the fixed plate. The bed moving system includes a second lever arm with a first and a second end. The first end of the second lever arm is rotatably coupled to the first lever arm at a point between the first end and the second end of the first lever arm, and the second end of the second lever arm is rotatably coupled to the rotating plate at a position that is offset a first horizontal distance from the first pivot point. The bed moving system includes a gas spring with a first end and a second end. The first end of the gas spring is rotatably coupled to the fixed plate and the second end of the gas spring is rotatably coupled to the second end of the first lever arm. The gas spring opposes a gravitational force acting on the bed frame as the bed frame moves from the horizontal position to the vertical position.

In one embodiment, the bed moving system includes an electrically activated linear actuator with a first end and a second end. The first end of the linear actuator is rotatably coupled to the fixed plate, and the second end of the linear actuator is rotatably coupled to the rotating plate. The electrically activated linear actuator includes a housing and a piston within the housing that extends outward from the housing as the bed frame moves to the horizontal position, and that contracts into the housing as the bed frame moves to the vertical position. In the embodiment, the bed moving system includes a reversible electric motor coupled to the piston. The electric motor operates in a first direction moves the bed frame to the horizontal position and operates in a second direction moves the bed frame to the vertical position.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
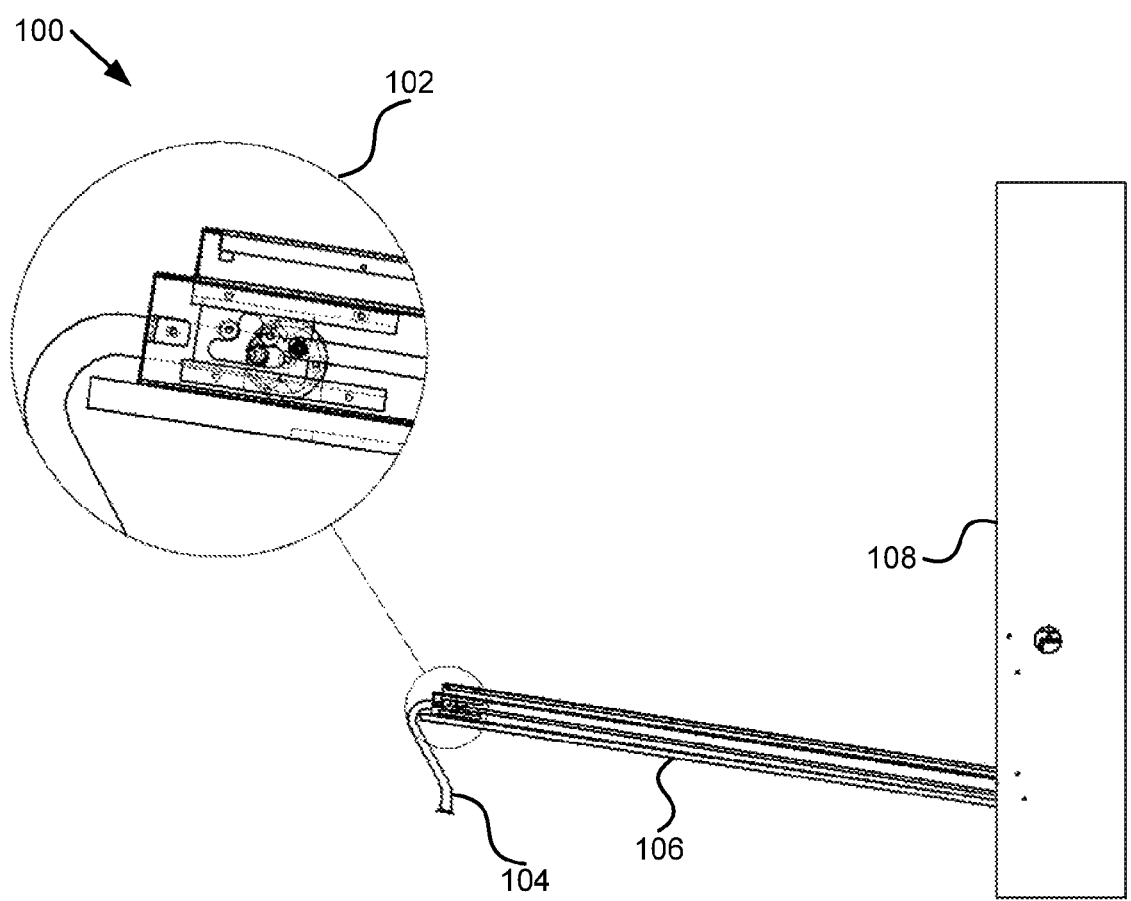
FIG. 1 is a perspective view illustrating one embodiment of a rotation apparatus in one embodiment of a wall bed system.

FIG. 1 is a perspective view illustrating one embodiment of a rotation apparatus 102 in one embodiment of a wall bed system 100. The rotation apparatus 102 is shown as applied to a wall bed system 100 with a rotatable bed leg 104, a bed frame 106, and a bed cabinet 108. The rotation apparatus 102 is depicted as a way to rotate a bed leg 104 from a retracted position (first position) to a lowered position (third position) so that the bed frame 106 can rest on the bed leg 104. While a single bed leg 104 is depicted, in one embodiment, the wall bed system 100 includes two or more rotation apparatuses 102 and two or more bed legs 104. For example, the bed frame 106 may include a rotation apparatus 102 and a bed leg 104 at each end of the foot of the bed frame 106 (i.e. end opposite where the bed frame 106 to the bed cabinet 108. The bed frame 106 and bed leg 104 may rotate around a first pivot point into a bed cabinet 108 so that the bed is stowed and an area under the bed can be used for other purposes. In one embodiment, the bed cabinet 108 is mounted against a wall. In another embodiment, the bed cabinet is recessed fully or partially into the wall. The rotation apparatus 102 is described in more detail below along with other embodiments.

Figure 2:
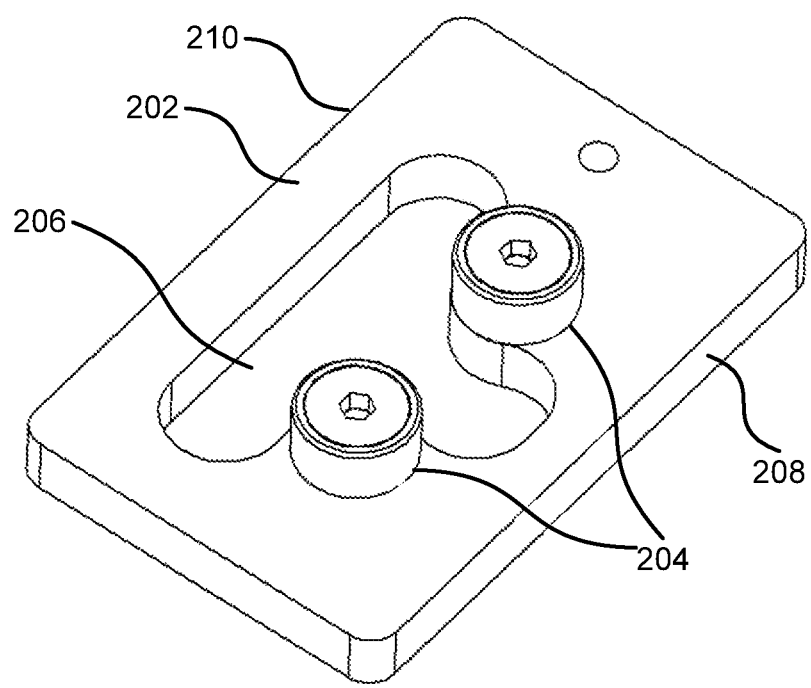
FIG. 2 is a perspective view of one embodiment of a rack plate relating to the rotation apparatus.
Figure 4A:
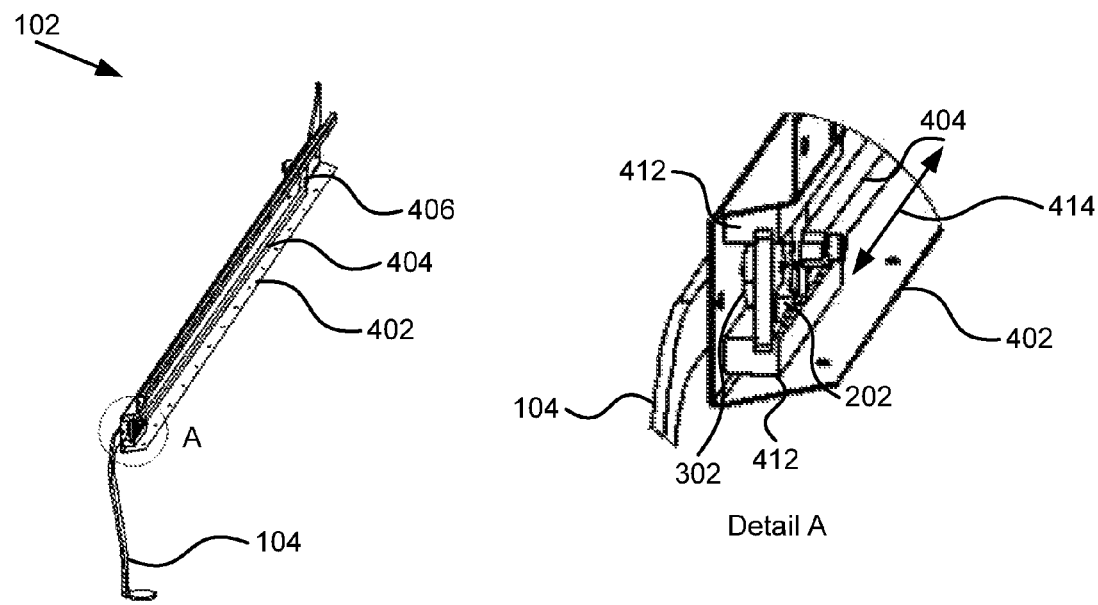
FIG. 4A is another perspective view of the embodiment of the rotation apparatus along with a bed leg and side rail.
Figure 4B:
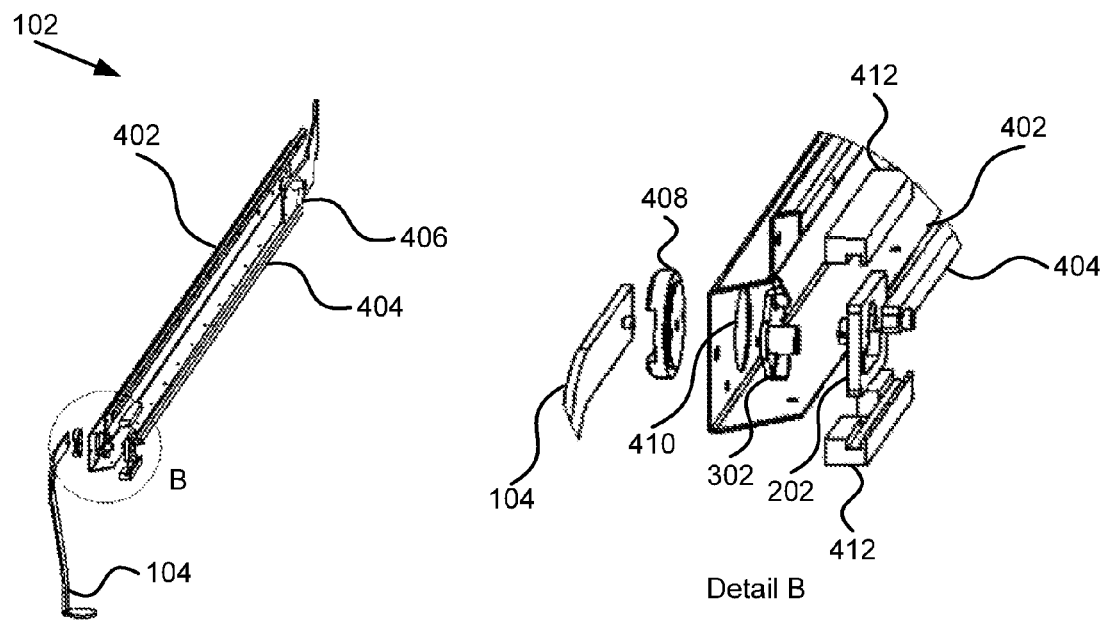
FIG. 4B is another exploded perspective view of the embodiment of the rotation apparatus along with a bed leg and side rail.

FIG. 2 is a perspective view of one embodiment of a rack plate 202 relating to the rotation apparatus 102. The rack plate 202 includes a T-shaped slot 206 and a plurality of protrusions 204 extending upright relative to the rack plate 202. The rack plate 202, in one embodiment, is movable relative to the bed frame 106 between a first position, a second position, and a third position. In one embodiment, the rack plate 202 engages the bed frame 106 along two edges 208, 210, as depicted in FIGS. 4A and 4B. In one embodiment, the protrusions 204 include rollers to reduce friction. In another embodiment, the protrusions 204 include a low friction surface. In another embodiment, the protrusions 204 are of the same material as the rack plate 202.

Figure 3:
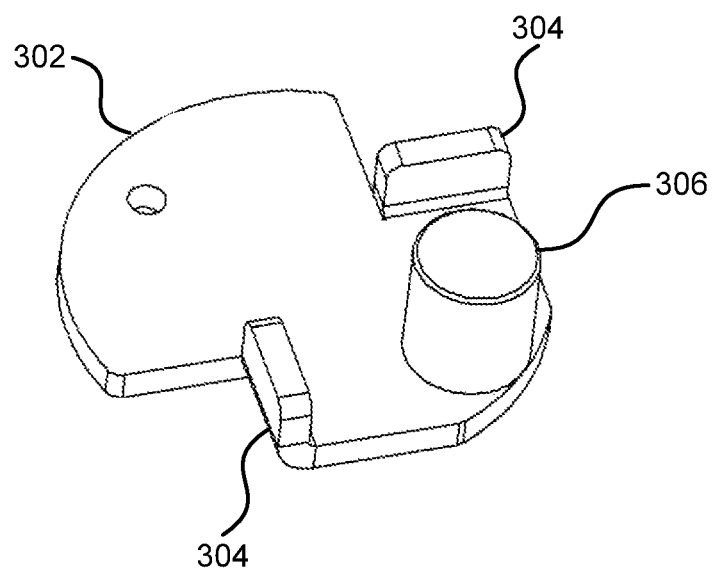
FIG. 3 is a perspective view of one embodiment of a pinion plate relating to the rotation apparatus.

FIG. 3 is a perspective view of one embodiment of a pinion plate 302 relating to the rotation apparatus 102. The pinion plate 302, in one embodiment, is rotatably coupled to the bed frame 106. In another embodiment, the pinion plate 302 is coupled to the bed leg 104 so the bed leg 104 rotates with the pinion plate 302. In another embodiment, the pinion plate 302 includes a plurality of extensions 304 that extend upright relative to the pinion plate 302, and a lock pin 306 movable within the T-shaped slot 206 of the rack plate 202. In one embodiment, the lock pin 306 includes a roller. In another embodiment, the lock pin 306 and/or the extensions 304 include a low friction surface. In another embodiment, the lock pin 306 and/or the extensions 304 are made of the same material as the pinion plate 302. In one embodiment, the lock pin 306 extends from the pinion plate 302 a distance greater than the extensions 304 extend from the pinion plate 302, which may allow the lock pin 306 to remain within the T-shaped slot 206 while the extensions 304 engage the protrusions 204 of the rack plate 202 as the rack plate 202 moves between the first position and the third position.

In one embodiment, the protrusions 204 and lock pin 306 are a solid material, such as metal. In another embodiment, one or more of the protrusions 204 and lock pin 306 include a covering. The covering may be a low resistance covering. For example, a low resistance covering on the lock pin 306 may allow the lock pin 306 to move more easily through the T-shaped slot 206 of the rack plate 202. In another example, a low resistance covering may allow the extensions 304 of the pinion plate 302 to slide more easily past the protrusions 204. In another embodiment, one or more of the protrusions 204 and lock pin 306 include a roller or similar device to allow lower friction movement of the lock pin 306 in the T-shaped slot 206 and extensions 304 past the protrusions 204.

FIG. 4A is a perspective view of the embodiment of the rotation apparatus 102 along with a bed leg 104 and a side rail 402 of the bed frame 106 and FIG. 4B is an exploded perspective view of the embodiment of the rotation apparatus 102 along with a bed leg 104 and side rail 402 of the bed frame 106. Detail A of FIG. 4A depicts and enlarged view of the rotation apparatus 102 as assembled and Detail B of FIG. 4B depicts and enlarged and exploded view of the rotation apparatus 102. The rotation apparatus 102 includes a rod 404 coupled to a lever 406. The rod 404 is coupled to the rack plate 202, and in the depicted embodiment, provides a force to the rack plate 202 to move the rack plate 202 between the first position, the second position, and the third position. In other embodiments, another force is provided to move the rack plate 202, such as an electric actuator, force applied by a user using another lever, force provided by an electric motor, or the like.

In one embodiment, the lever 406 is a stationary lever 406 in a fixed position relative to the bed cabinet 108 such that when the bed frame 106 is lowered, the lever 406 remains fixed and pushes the rod 404 toward the rack plate 202.

The rotation apparatus 102 includes a connector 408 that connects to the pinion plate 302 through an opening 410. The opening 410, in one embodiment, serves as a pivot point for the rotation apparatus 102 to rotate the pinion plate 302. In the depicted embodiment, as the pinion plate 302 rotates, the connector 408 rotates, which also rotates the bed leg 104. The connector 408, in one embodiment, connects to the bed leg 104. In another embodiment, the pinion plate 302 connects directly to the bed leg 104. The operation of the rotation apparatus 102 is described in more detail in relation to FIGS. 6A-6E. The opening 410 may be as depicted or may be larger or smaller than depicted. The pinion plate 302 and/or connector 408 may be shaped to accommodate the size of the opening 410. In one embodiment, the pinion plate 302 and/or connector 408 include a bushing, roller, bearing, or other mechanism to reduce friction while the pinion plate 302 and connector 408 rotate.

The rotation apparatus 102, in one embodiment, includes slides 412 mounted above and below the rack plate 202. In one embodiment, the slides 412 are slidably coupled to the rack plate 202 and restrain the rack plate 202 to slide in a direction in line with a direction of the side rail 402 and rod 404. An arrow 414 indicates the direction in line with the direction of the side rail 402 that the rack plate 202 moves. The slides 412, in the depicted embodiment, include slots as shown sized to accommodate a thickness of the rack plate 202. In another embodiment, the rack plate includes slots and the side rail 402 includes pins, rods, or another device to restrain the rack plate 202 and allow the rack plate 202 to move between the first and third positions. One of skill in the art will recognize other mechanisms to restrain and guide the rack plate 202 so that the rack plate 202 moves between the first position and the third position. The slides 412 and/or the rack plate 202 may include a low-friction coating, bushing, etc. to reduce friction between the rack plate 202 and slides 412.

Figure 5:
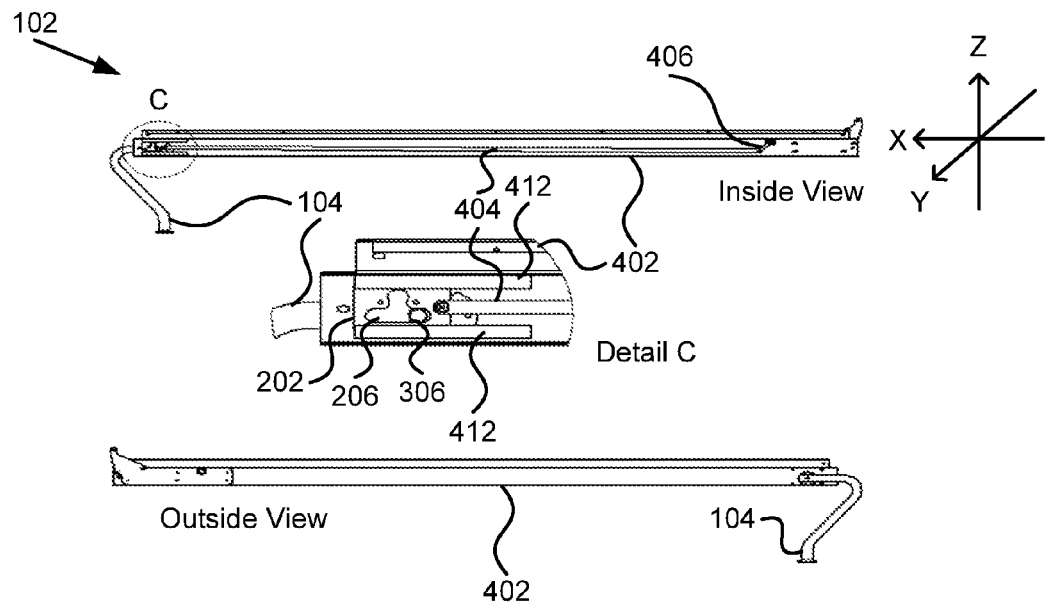
FIG. 5 is an inside view and an outside view of the embodiment of the rotation apparatus along with a bed leg and side rail.

FIG. 5 is an inside view and an outside view of the embodiment of the rotation apparatus 102 along with a bed leg 104 and side rail 402. Detail C is an enlargement of the rotation apparatus 102. The inside view depicts the lever 406 in relation to the side rail 402 when the bed frame 106 is in the horizontal position. The lever 406 is angled approximately 45° relative to the bed frame 106 (along the "X" axis) while the bed frame is in a horizontal position, which is 135° from a vertical "Z" axis measured in a first direction corresponding to a direction that the bed frame 106 moves from a vertical position to the horizontal position (i.e. counterclockwise for the inside view). The lever 406 is shown at an angle approximately 135° from vertical measured in a first direction that the bed rotates from vertical (i.e. counterclockwise for the inside view).

The lever 406, in one embodiment, is fixed with respect to the bed cabinet 108 so that when the bed frame is in the stored, vertical position, the lever 406 remains fixed and the bed frame 106 rotates relative to the lever 406. When the side rail 402 is in the horizontal position, the lever 406 is at a 45° angle with respect to the side rail 402 so that that the lever 406 is in an extended position. The rotation of the bed frame 106 as the bed frame 106 moves from a horizontal position to a vertical, stowed position (i.e. clockwise for the inside view) causes the end of the lever 406 attached to the rod 404 to retract away from the leg end of the bed frame 106 so the lever 406 is 135° relative to the side rail 402 in a retracted position, which causes the rod 404 to apply a force to move the rack plate 202 in a direction toward the lever 406, which causes the bed leg 104 to rotate counterclockwise to a stowed position. The length and position of the lever 406 may be chosen to select an amount that the rack plate 202 moves during movement of the bed frame 106 from the vertical position to the horizontal position. Detail C also depicts the rack plate 202 with the lock pin 306 of the pinion plate 302 in the T-shaped slot 206. FIG. 5 includes slides 412 on either side of the rack plate 202 and the rack plate 202 moves horizontally, with respect to the X axis, within the slides 412. The rack plate 202 is depicted in the third position, which will be described in more detail with respect to FIGS. 6A-6E.

Figure 6A:
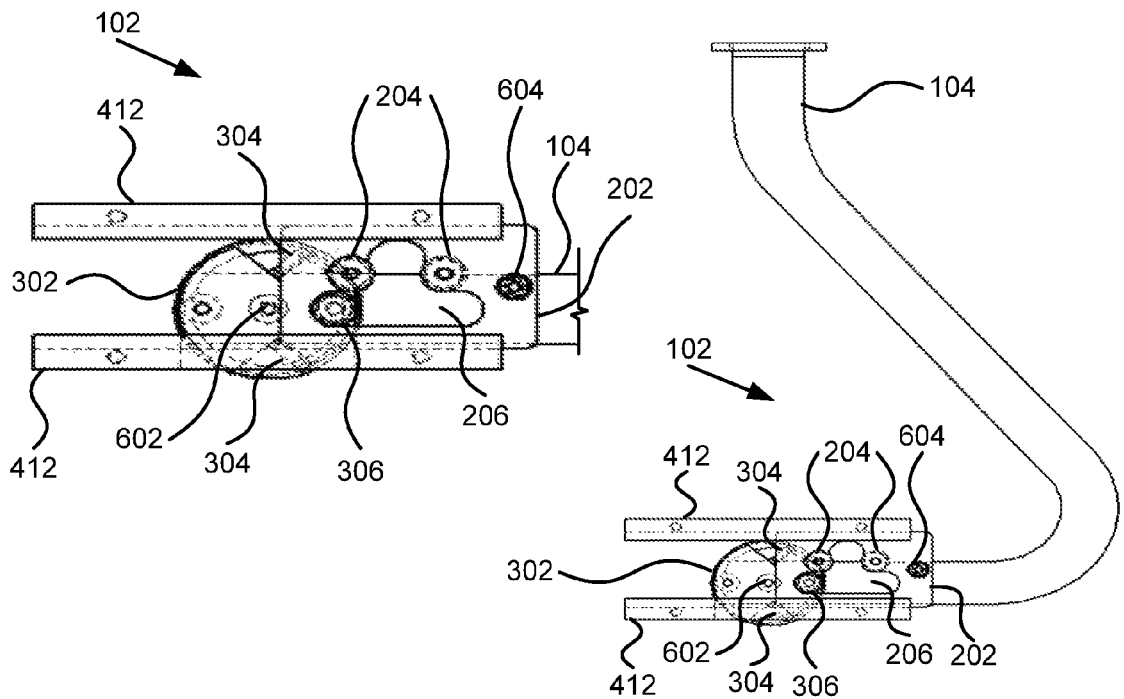
FIG. 6A is a side view of the rotation apparatus and attached bed leg where the rotation apparatus is in a first position.

FIG. 6A is a side view of the rotation apparatus 102 and attached bed leg 104 where the rotation apparatus 102 is in a first position. FIG. 6A also includes an enlarged view of the rotation apparatus 102. In the first position, the bed leg 104 is in a retracted position so that the bed leg 104 is vertical with respect to a portion of the bed where a person would lie. While the rotation apparatus 102 is depicted in FIG. 6A as horizontal, typically when the rotation apparatus 102 is in the first position, the bed frame 106 is vertical and the bed leg 104 is stowed in the bed cabinet 108. The rod 404 (not shown) is coupled to the right side of the rack plate 202 the rack plate 202 at an attachment point 604 in the first position is moved toward the lever 406 such that the lock pin 306 is positioned in the T-shaped slot 206 at a position farthest away from wherein the rod 404 connects to the rack plate 202. The lock pin 306 is positioned toward the lever 406 which is to the right of the pivot point 602 of the pinion plate 302 when viewed as shown in FIG. 6A.

Figure 6B:
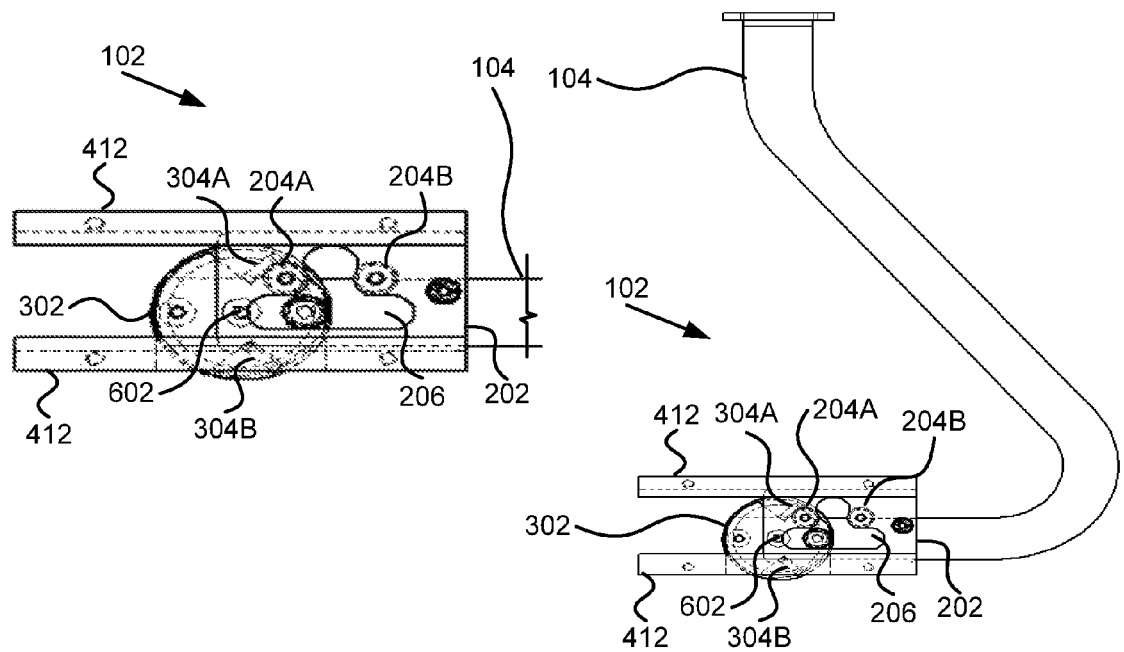
FIG. 6B is a side view of the rotation apparatus and attached bed leg where the rotation apparatus is part way between the first position and a second position.

FIG. 6B is a side view of the rotation apparatus 102 and attached bed leg 104 where the rotation apparatus 102 is part way between the first position and a second position. FIG. 6B also includes an enlarged view of the rotation apparatus 102. As the bed frame 106 moves from the vertical position, the rod 404 pushes the rack plate 202 toward the end of the bed frame 106 and away from the lever 406. A first protrusion 204A engages a first extension 304A. In one embodiment, a face of the first extension 304A that engages the first protrusion 204A is oriented approximately perpendicular to a face of the second extension 304B that engages the second protrusion 204B in a second position and the first extension 304A and the second extension 304B are oriented to face the lock pin 306.

The first extension 304A is positioned above the pivot point 602, so as the rack plate 202 moves away from the lever 406 (right to left in FIG. 6B) the first protrusion 204A exerts a force that causes the pinion plate 302 to rotate counterclockwise. Engagement between the first extension 304A and the first protrusion 204A rotates the pinion plate 302 in relation to the rack plate 202 in a first direction from a first pinion plate orientation to a second pinion plate orientation that is approximately 90° from the first pinion plate orientation. As the pinion plate 302 rotates, the lock pin 306 moves in the T-shaped slot to a position shown in FIG. 6C, which is the second position.

Figure 6C:
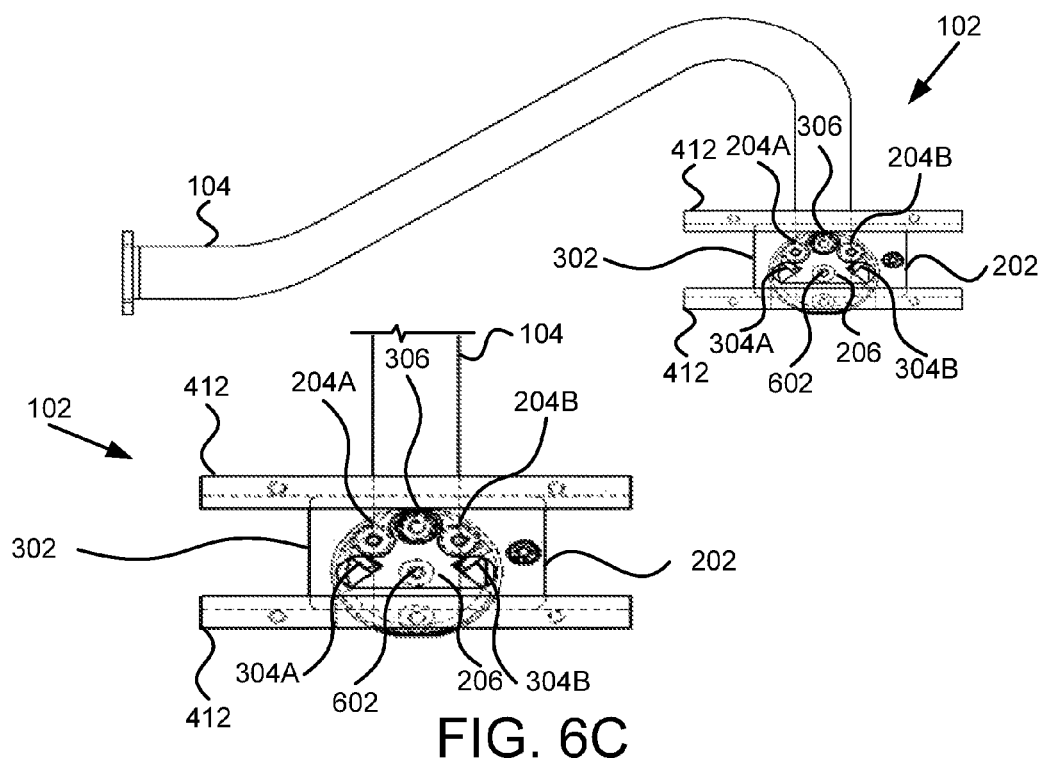
FIG. 6C is a side view of the rotation apparatus and attached bed leg where the rotation apparatus is in the second position.

FIG. 6C is a side view of the rotation apparatus 102 and attached bed leg 104 where the rotation apparatus 102 is in the second position. FIG. 6C also includes an enlarged view of the rotation apparatus 102. In the second position, the lock pin 306 is in the section of the T-shaped slot 206 that extends vertically, as shown. The bed leg 104 rotates with the pinion plate 302 so that the bed leg 104 is 90° from the position of the bed leg 104 when the rotation apparatus 102 is in the first position. As the pinion plate 302 rotates, the second extension 304B rotates and contacts the second protrusion 204B. In addition, further rotation causes the first extension 304A to begin to pull away from the first protrusion 204A.

Figure 6D:
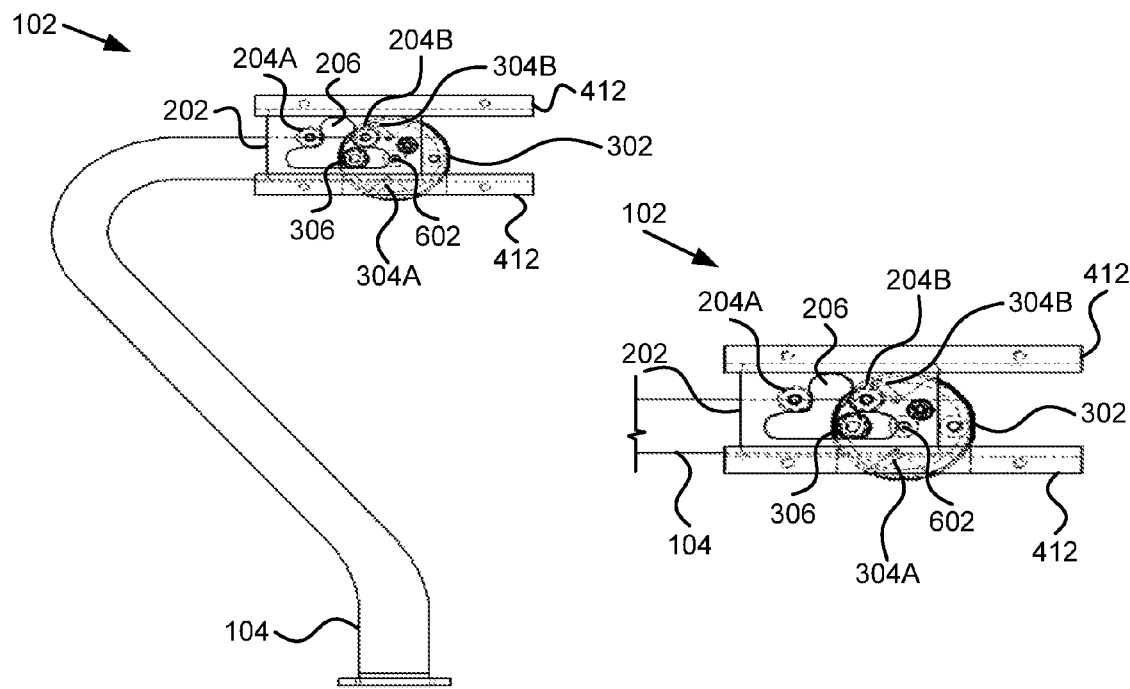
FIG. 6D is a side view of the rotation apparatus and attached bed leg where the rotation apparatus is part way between the second position and a third position.

FIG. 6D is a side view of the rotation apparatus 102 and attached bed leg 104 where the rotation apparatus 102 is part way between the second position and a third position. FIG. 6D also includes an enlarged view of the rotation apparatus 102. As the rack plate 202 moves to toward the end of the bed frame 106 and away from the lever 406, the second extension 304B exerts force on the second protrusion 204B and the T-shaped slot 206 of the rack plate 202 exerts a force on the lock pin 306 to guide movement of the lock pin 306 and rotates the pinion plate 302 and bed leg 104. The lock pin 306 moves away from the upper slot of the T-shaped slot 206 to a position along near the center of the T-shaped slot 206 and then starts to move along the portion of the T-shaped slot 206 shown in FIG. 6D to the right side.

Figure 6E:
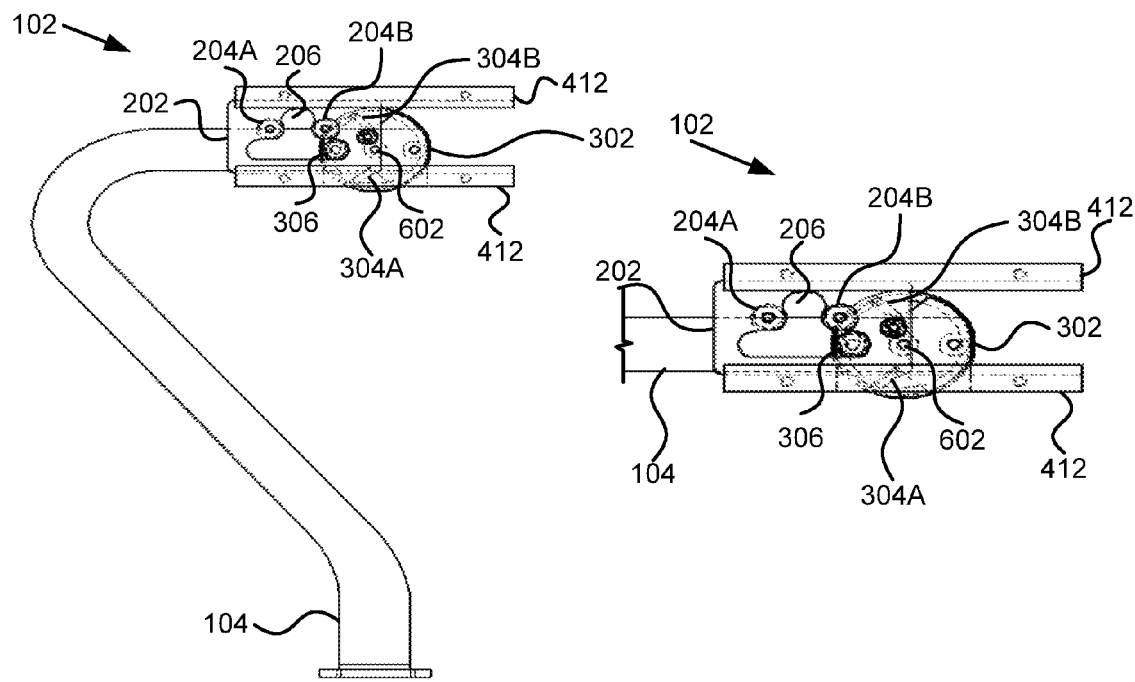
FIG. 6E is a side view of the rotation apparatus and attached bed leg where the rotation apparatus is in the third position.

FIG. 6E is a side view of the rotation apparatus 102 and attached bed leg 104 where the rotation apparatus 102 is in the third position. FIG. 6E also includes an enlarged view of the rotation apparatus 102. In the third position, the rack plate 202 moves to a position where the lock pin 306 is at an end of the T-shaped slot 206 opposite where the lock pin 306 started in the first position, and to the right end of the T-shaped slot 206 as viewed in FIG. 6E. The bed leg 104 and pinion plate 302 are rotated 180° from the first position shown in FIG. 6A and is perpendicular to the bed frame 106. With the lock pin 306 located as shown in FIG. 6E and the rod 404 pushing on the rack plate 202 to maintain the rack plate 202 so that the rotation apparatus 102 is in the third position, the bed leg 104 may provide support for the bed frame 106.

Note that as the bed frame 106 is raised back to the vertical position, the rack plate 202 moves in a direction away from the end of the bed frame 106 toward the lever 406 and the second protrusion 204B will contact the second extension 304B and the bed leg 104 and the pinion plate 302 rotate clockwise. As the rod 404 continues to move the rack plate 202, the rotation apparatus 102 rotates the bed leg 104 and pinion plate 302 and the rotation apparatus 102 moves to the second position and then to the first position in an order opposite that described above with respect to FIGS. 6A to 6E.

In one embodiment, the T-shaped slot 206 is as depicted in FIG. 2. In another embodiment, the T-shaped slot 206 is modified so that the T-shaped slot 206 has angles that are different from the 90° angle shown in FIG. 2. For example, the shape of the T-shaped slot 206 as the lock pin 306 moves from the first position to the second position and from the second position to the third position may be more gradual than shown. In other embodiments, the T-shaped slot 206 may be in more of a "Y" shape. In another embodiment, the T-shaped slot 206, protrusions 204, and extensions 304 may be shaped so that the pinion plate 302 moves either less than 180° or more than 180°. One of skill in the art will recognize other ways to form the rack plate 202 and pinion plate 302 to rotate a different amount than shown and different uses for the rotation apparatus 102.

Figure 7A:
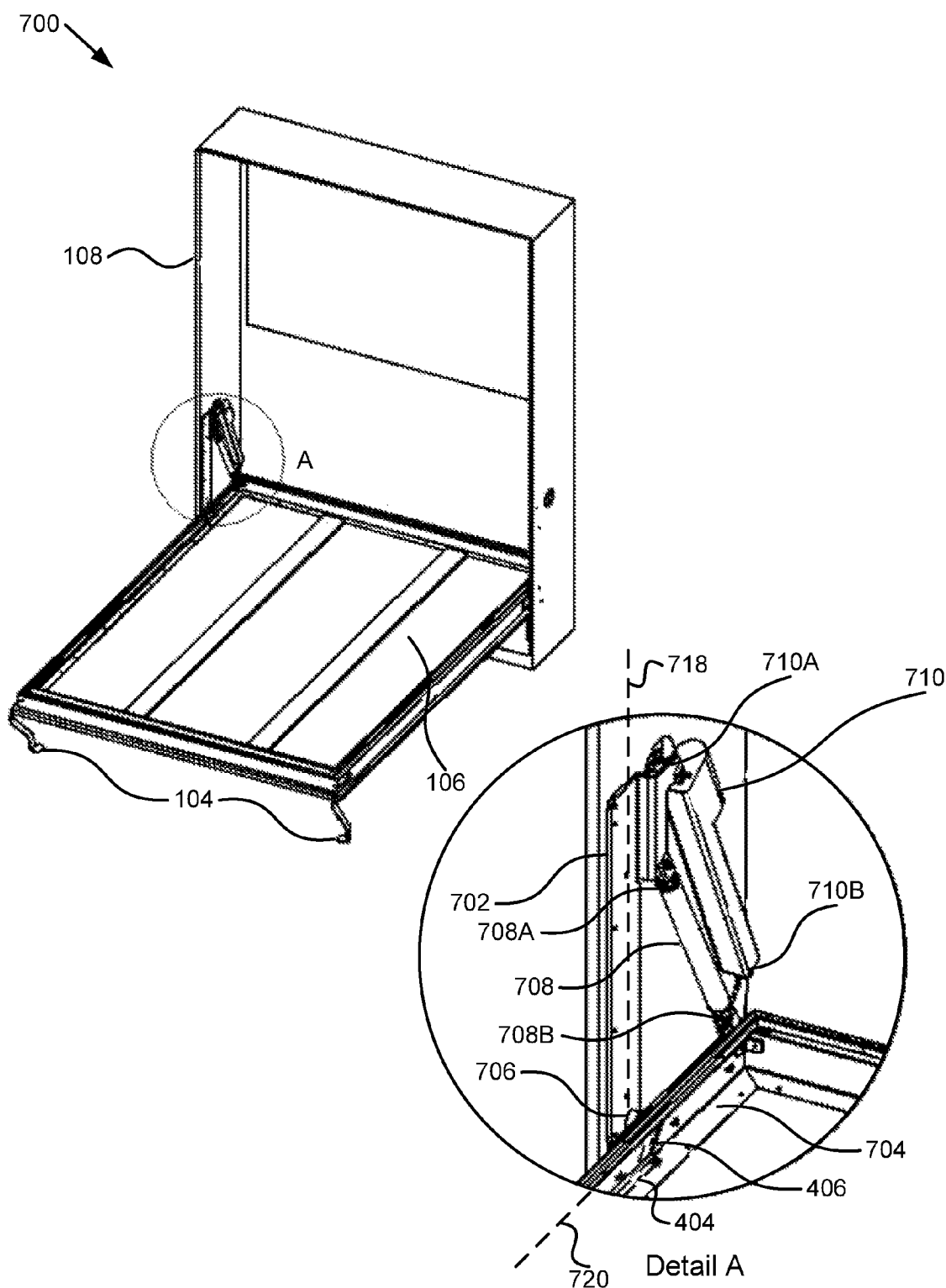
FIG. 7A is a perspective view of a wall bed with one embodiment of a bed moving apparatus.
Figure 7B:
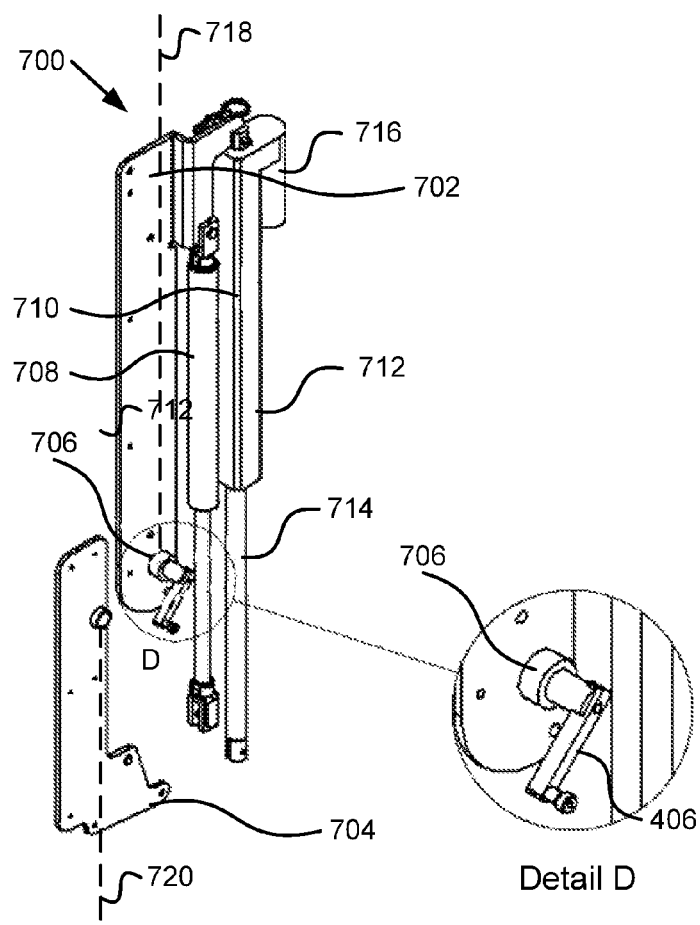
FIG. 7B is an exploded perspective view of the embodiment of the bed moving apparatus.
Figure 7C:
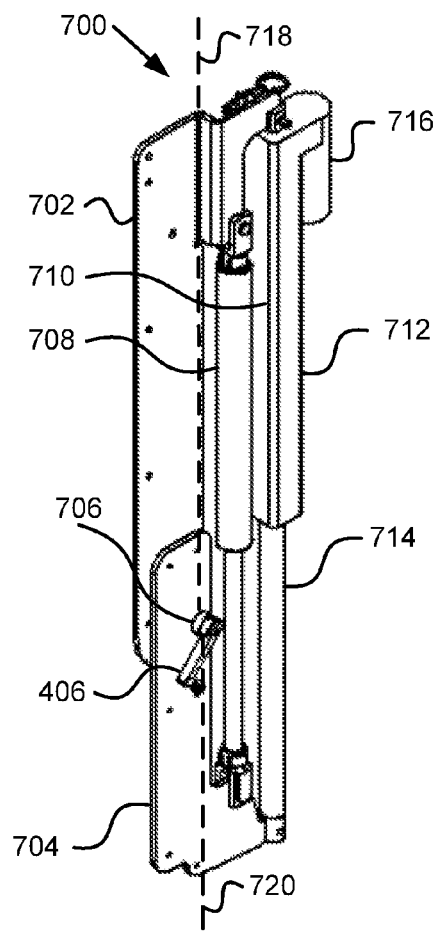
FIG. 7C is a perspective view of the embodiment of the bed moving apparatus.

FIG. 7A is a perspective view of a wall bed with one embodiment of a bed moving apparatus 700. FIG. 7B is an exploded perspective view of the embodiment of the bed moving apparatus 700. FIG. 7C is a perspective view of the embodiment of the bed moving apparatus. The bed moving apparatus 700 includes a fixed plate 702, a rotating plate 704, a first pivot point 706, a gas spring 708, a linear actuator 710 with a housing 712, a piston 714, and a motor 716, which are described below.

The bed moving apparatus 700, in one embodiment, includes a fixed plate 702 mounted on a vertical wall of a bed cabinet 108, and a rotating plate 704 rotatably coupled to the fixed plate 702 at a first pivot point 706. The rotating plate 704 is mounted to a bed frame 106. When the bed frame 106 is in a vertical position, the rotating plate 704 is approximately parallel to the fixed plate 702, and when the bed frame 106 is in a horizontal position, the rotating plate 704 is approximately perpendicular to the fixed plate 702. In the vertical position, where the rotating plate 704 and fixed plate 702 are described as parallel, the fixed plate 702 and rotating plate 704 are substantially aligned. For example, a vertical line 718 relative to the fixed plate 702 through the first pivot point 706 is parallel to a line 720 passing through the rotating plate 704 and first pivot point 706 that aligns with the bed frame 106 so the lines are "parallel." When the bed frame 106 moves to the horizontal position, this line 720 through the first pivot point 706 and aligned with the bed frame 106 is perpendicular to the vertical line 718 aligned with the fixed plate 702.

The bed moving apparatus 700, in one embodiment, includes a gas spring 708 with a first end 708A and a second end 708B. The first end 708A of the gas spring 708 is rotatably coupled to the fixed plate 702, and the second end 708B of the gas spring 708 is rotatably coupled to the rotating plate 704. Typically, the gas spring 708 opposes gravitational force acting on the bed frame 106 as the bed frame 106 moves from the horizontal position to the vertical position. Typically the gas spring 708 is sized based on an amount of force required so that as the bed frame 106 is lowered, the bed frame 106 can be lowered with significantly less force than if the gas spring 708 were not present. The gas spring 708 is typically sized based on a distance from the first pivot point 706, a weight of the bed frame 106 with a mattress, bedding, etc., and gravitational forces. One of skill in the art will recognize how to size a gas spring to provide adequate opposing force and a desired rate of movement of the bed frame 106.

The gas spring 708 is also sized to fit between the location where the first end 708A is coupled to the fixed plate 702 and the location where the second end 708B is coupled to the rotating plate 704 for an entire range of motion of the bed frame 106 between the vertical position and the horizontal position. In one embodiment, the fixed plate 702 and the rotating plate 704 are shaped to so that when the bed frame 106 is in the vertical position, the gas spring 708 will be offset from the first pivot point 706. For example, the gas spring 708 may be horizontally offset from the fixed plate 702 as depicted so that when the bed frame 106 is in the vertical position, the gas spring 708 is recessed in a direction into the bed cabinet 108 and inset from the vertical line 718 bisecting the first pivot point 706. The gas spring 708 may be positioned to fit between the bed cabinet 108 and the bed frame 106 when the bed frame 106 is in the vertical position. Offsetting, the gas spring 708 may allow movement of the gas spring 708 without interference with the bed frame 106 or fixed plate 702 and may allow the gas spring to fit in the bed cabinet 108 more easily.

In one embodiment, the bed moving apparatus 700 includes an electrically activated linear actuator 710 with a first end 710A and a second end 710B. The first end 710A of the linear actuator 710 is rotatably coupled to the fixed plate 702 and the second end 710B of the linear actuator 710 is rotatably coupled to the rotating plate 704. The electrically activated linear actuator 710 includes a housing 712 and a piston 714 within the housing 712 that extends outward from the housing 712 as the bed frame 106 moves to the vertical position, and that contracts into the housing 712 as the bed frame 106 moves to the horizontal position. The linear actuator 710, in one embodiment, is sized with enough force to move the bed frame 106 from the vertical position to the horizontal position and back with the gas spring 708 in place providing an opposing force to gravitational forces on the bed frame 106.

The linear actuator 710 may be positioned to be offset from the vertical line 718 bisecting the first pivot point 706 and from the gas spring 708 to allow movement of the linear actuator 710 and the gas spring 708 as the bed frame 106 moves from the vertical position to the horizontal position. In one embodiment, the gas spring 708 is positioned between the vertical line 718 and the linear actuator 710, as depicted in FIG. 7A. In another embodiment, the first end 710A of the linear actuator 710 is coupled to the fixed plate 702 a vertical distance from where the first end 708A of the gas spring 708 is coupled to the fixed plate 702. For example, the first end 710A of the linear actuator 710 is coupled to the fixed plate 702 a vertical distance from a horizontal line 720 bisecting the first pivot point 706 that is more than a vertical distance that the first end 708A of the gas spring 708 is coupled to the fixed plate 704.

In another embodiment, the second end 710B of the linear actuator 710 is coupled to the rotating plate 704 at a location that is vertically offset from where the second end 708B of the gas spring 708 connects to the rotating plate 704 (see FIGS. 7B and 7C). For example, the second end 710B of the linear actuator 710 may connect to the rotating plate 704 a vertical distance from the first pivot point 706 that is greater than a vertical distance that the second end 708B of the gas spring 708 is coupled to the rotating plate 704, as depicted in FIGS. 7B and 7C. The vertical offsets of the linear actuator 710 with respect to the gas spring 708, in one embodiment, accommodate a length of the linear actuator 710 relative to the gas spring. In another embodiment, the vertical offsets of the linear actuator 710 with respect to the gas spring 708 change an amount of force required by the linear actuator 710 to move the bed frame 106 with respect to an amount of force that the gas spring 708 exerts to balance against gravitational forces on the bed frame 106.

The linear actuator 710, in one embodiment, includes a worm gear that moves the piston 714 into and out of the housing 712. In another embodiment, the linear actuator 710 includes a reversible electric motor 716, and powering the electric motor 716 in one direction moves the bed frame 106 from the vertical position to the horizontal position and powering the electric motor 716 in the opposite direction moves the bed frame 106 from the horizontal position to the vertical position. In another embodiment, the linear actuator 710 includes one or more gears and/or one or more belts to transfer force from the electric motor 716 to moving the piston 714 in and out of the housing 712. In another embodiment, the linear actuator 710 includes mechanical means to reverse motion of the piston 714 from in to out while the electric motor 716 turns in one direction. One of skill in the art will recognize other ways to configure a linear actuator 710 with a housing 712 and a piston 714 that extends in and out of the housing 712 to raise and lower the bed frame 106.

In one embodiment, the fixed plate 702 and the rotating plate 704 include the first pivot point 706 and connections to the gas spring 708 and linear actuator 710. For example, the fixed plate 702 may be a single plate extending from at least the first pivot point 706 long the bed cabinet 108 to connections with the gas spring 708 and linear actuator 710. Likewise the rotating plate 702 may be a single plate extending from at least the first pivot point 706 along the bed frame 106 to connections with the gas spring 708 and linear actuator 710.

In another embodiment, the fixed plate 702 includes two or more sections where one section is a bracket mounted on the bed cabinet 108 near the first pivot point 706, and one or more sections are mounted near where the first end 708A of the gas spring 708 and the first end 710A of the linear actuator 710 are connected. The sections of the fixed plate 702 may be independent from each other and may use the bed cabinet 108 for structural support. In another example, the rotating plate 704 includes two or more sections where one section is a bracket mounted on the bed frame 106 near the first pivot point 706, and one or more sections are mounted on the bed frame 106 near where the second end 708B of the gas spring 708 and the second end 710B of the linear actuator 710 are connected. The sections of the rotating plate 704 may be independent from each other and may use the bed frame 106 for structural support.

In one embodiment, the bed moving apparatus 700 is included on one side of a bed frame 106. In another embodiment, the bed moving apparatus 700 is included on both sides of the bed frame 106. In another embodiment, one side of the bed frame 106 includes a bed moving apparatus 700 with a gas spring 708 and a linear actuator 710 while the other side of the bed frame includes a gas spring 708 with no linear actuator 710. In yet another embodiment, one side of the bed frame 106 includes a bed moving apparatus 700 with a gas spring 708 and a linear actuator 710 while the other side of the bed frame includes a linear actuator 710 with no gas spring 708. In another embodiment, both sides of the bed frame 106 include a bed moving apparatus 700 with a gas spring 708 and a linear actuator 710. In one embodiment, where both sides of a bed frame 106 include a linear actuator 710, the wall bed system 100 may include a control system to operate both linear actuators 710 simultaneously. For example, one linear actuator 710 may be a master that controls a second linear actuator 710. In another embodiment, the bed moving apparatus 700 for one side of a bed frame 106 includes two or more gas springs 708 and/or two or more linear actuators 710.

Figure 8:
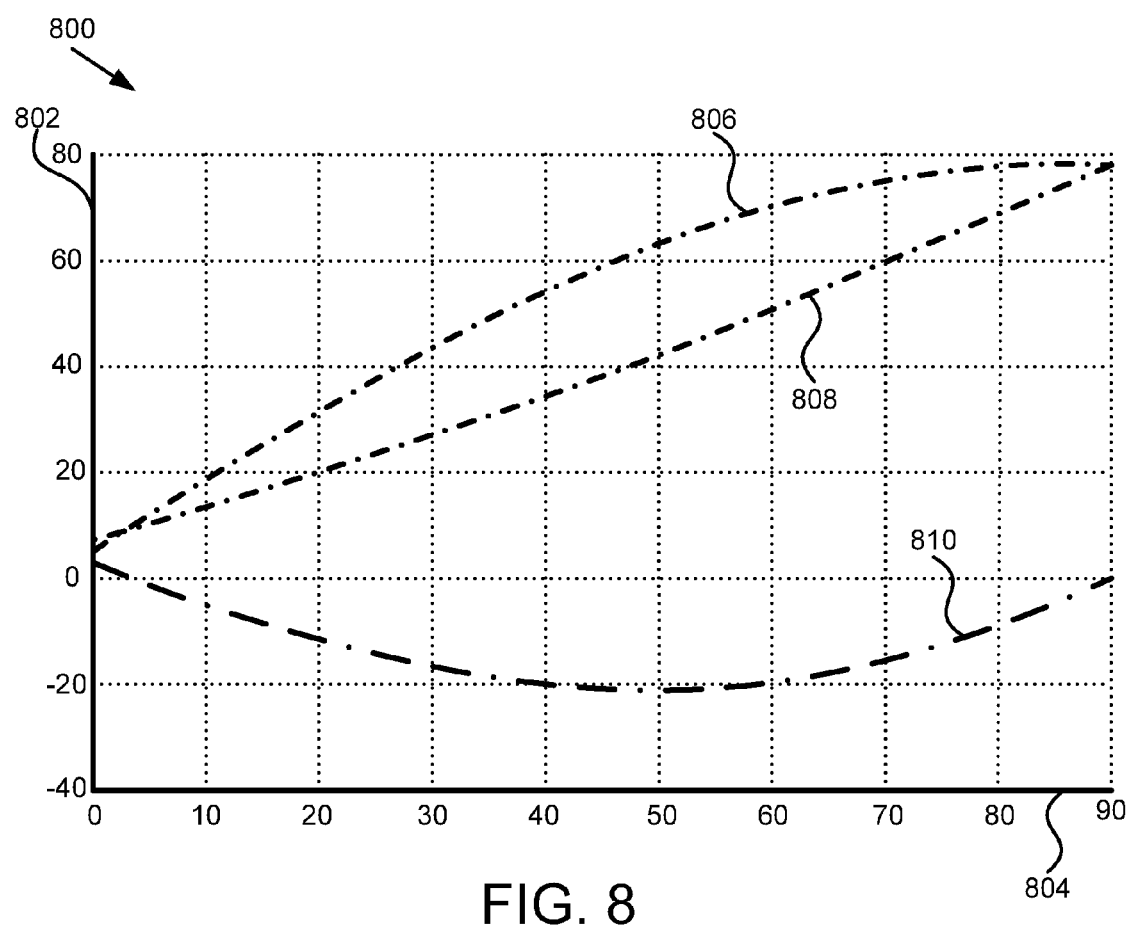
FIG. 8 is a graph of forces on the embodiment of the bed moving apparatus.

FIG. 8 is a graph 800 of forces on the embodiment of the bed moving apparatus 700. The vertical axis 802 is force in kilograms. The horizontal axis 804 is an angle of rotation of the bed frame 106 relative to the bed cabinet 108 where zero degrees represents the bed frame 106 in the vertical position. The top line 806 represents the weight of the bed frame 106 at the end of the bed frame 106 away from the first pivot point 706. The middle line 808 represents an opposing force produced by the gas spring 708 as the bed frame 106 is lowered to the horizontal position, which corresponds to 90 degrees on the graph 800. The bottom line 810 is the difference between the top line 806 and the middle line 808. For a queen sized bed, the bed frame 106, mattress, and bedding may be around 160 kilograms ("kg") and a lifting force at the edge of the bed frame 106 of up to around 20 kg. The gas spring 708 may be sized based on the size of the bed frame 106, mattress, etc. and may be sized to shape the bottom line 810 to be below a maximum force for the range from zero degrees to ninety degrees.

Figure 9A:
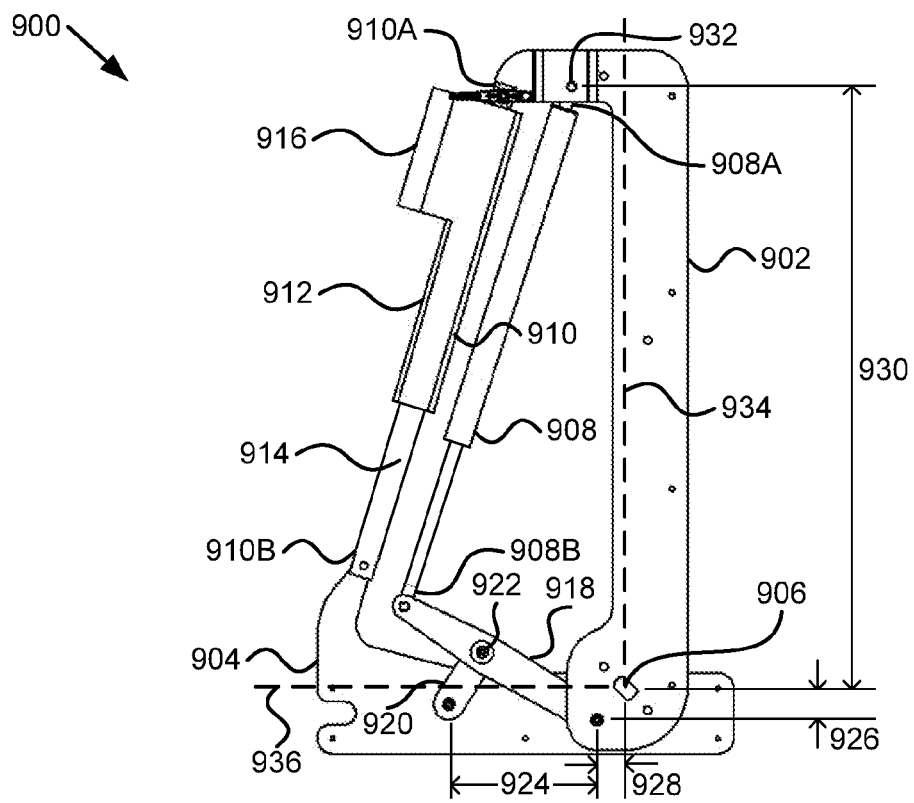
FIG. 9A is a side view of one embodiment of an alternate bed moving apparatus.

FIG. 9A is a side view of one embodiment of an alternate bed moving apparatus 900. The alternate bed moving apparatus 900 includes a fixed plate 902, a rotating plate 904, a first pivot point 906, a gas spring 908, a linear actuator 910 with a housing 912, a piston (not shown), a motor 916, a first lever arm 918, and a second lever arm 920 which are described below. The alternate bed moving apparatus 900 also includes a lever 406, which is substantially similar to the lever 406 described in relation to the rotation apparatus 102 described above.

In one embodiment, the alternate bed moving apparatus 900 includes a fixed plate 902 mounted on a vertical wall of a bed cabinet 108 and a rotating plate 904 rotatably coupled to the fixed plate 902 at a first pivot point 906. The rotating plate 902 is mounted to a bed frame 106. When the bed frame 106 is in the vertical position the rotating plate 904 is approximately parallel to the fixed plate 902, and when the bed frame is in the horizontal position the rotating plate 904 is approximately perpendicular to the fixed plate 902.

The alternate bed moving apparatus 900 includes a first lever arm 918 with a first end and a second end. The first end of the first lever arm 918 is rotatably coupled to the fixed plate 902. The alternate bed moving apparatus 900 includes a second lever arm 920 with a first and a second end. The first end of the second lever arm 920 is rotatably coupled to the first lever arm 918 at a point between the first end and the second end of the first lever arm 918. The second end of the second lever arm 920 is also rotatably coupled to the rotating plate 904 at a position that is a first horizontal distance 924 from the first pivot point 906.

The alternate bed moving apparatus 900 includes a gas spring 908 with a first end 908A and a second end 908B. The first end 908A of the gas spring 908 is rotatably coupled to the fixed plate 902, and the second end of the gas spring 908 is rotatably coupled to the second end of the first lever arm 918. The gas spring 908 opposes a gravitational force acting on the bed frame 106 as the bed frame 106 moves from the horizontal position to the vertical position.

The alternate bed moving apparatus 900 is advantageous over the bed moving apparatus 700 of FIGS. 7A-7C in that the amount of force required to oppose gravitational forces is reduced while using a gas spring 908 similar to the gas spring 708 of the bed moving apparatus 700 of FIGS. 7A-7C. The force required will be explained further in relation to FIG. 11.

In one embodiment, the first end of the first level arm 918 is coupled to the fixed plate 902 at the first pivot point 906. In another embodiment, the first end of the first lever arm 918 is coupled to the fixed plate 902 at a point that is offset from the first pivot point 906. For example, the first end of the first lever arm 918 may be coupled to the fixed plate 902 a particular distance. For instance, the first end of the first lever arm 918 may be coupled to the fixed plate 902 a first vertical distance 926 below the first pivot point 906. In another instance, the first end of the first lever arm 918 may offset from the first pivot point 906 a second horizontal distance 928.

In one embodiment, the second lever arm 920 is coupled to the first lever arm 918 at a second pivot point 922. The second pivot point 922 is off center and such that the second pivot point 922 is between a center of the first lever arm 918 and the second end of the first lever arm 918. In one embodiment, the second lever arm 920 is less than half the length of the first lever arm 918.

In another instance, the particular distance that the first end of the first lever arm 918 is offset from the first pivot point 906 and the total distance includes a first vertical distance 926 and a second horizontal distance 928. The offset from the first pivot point 906 creates a force dynamic that differs from when the first end of the first lever arm 918 is coupled to the fixed plate 902 at the first pivot point 906. The offset of the first pivot point 906 to the coupling the first end of the first lever arm 918 to the fixed plate 902, in one embodiment, is kept to a minimum. In one embodiment, the first end 908A of the gas spring 908 is rotatably coupled to the fixed plate 902 at a third pivot point 932 and the third pivot point 932 is positioned a second vertical distance 930 above the first pivot point 906. The second vertical distance 930, in one embodiment, is sized to accommodate the gas spring 908.

Figures 9B, 9C:
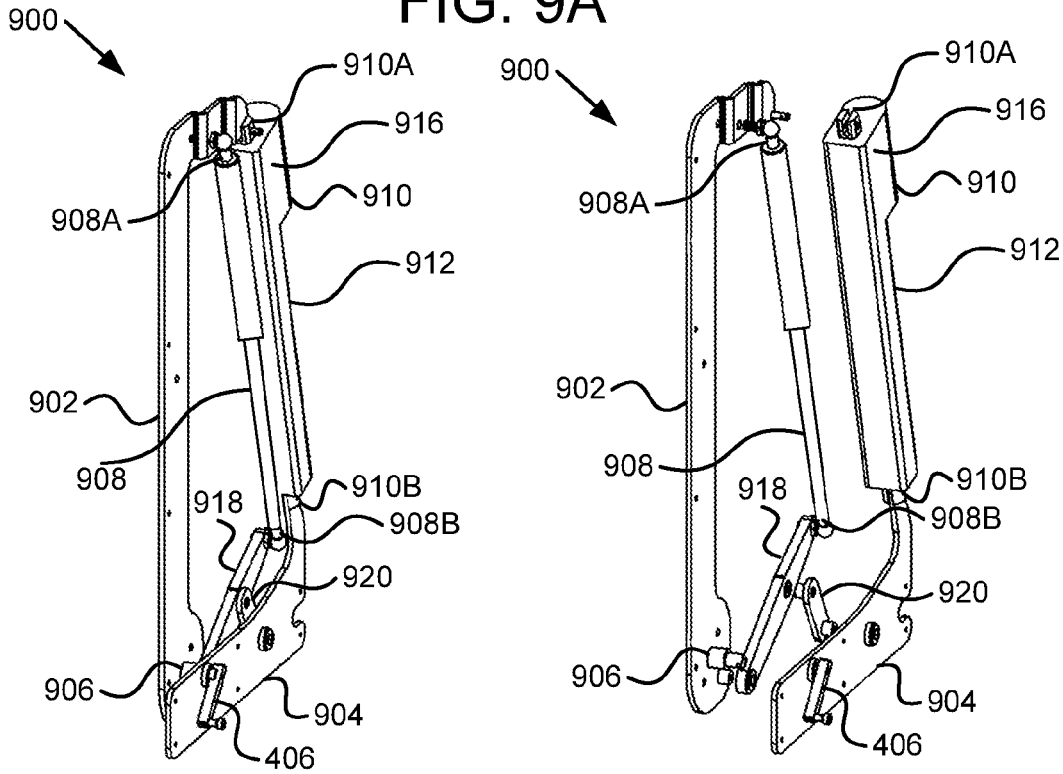
FIG. 9B is a perspective view of the embodiment of an alternate bed moving apparatus.
FIG. 9C is an exploded perspective view of the embodiment of an alternate bed moving apparatus.

With the first lever arm 918 and the second lever arm 920 connected as shown in FIGS. 9A-9C, the forces applied to the bed frame 106 by the gas spring 908 through the first lever arm 918 and the second lever arm 920 change as the bed moves from vertical to horizontal. The force applied by the gas spring 908 to oppose gravitational forces on the bed frame 106 differ from the force applied by the gas spring 708 to oppose gravitational forces on the bed frame 106 of the bed moving apparatus 700 of FIGS. 7A-7C.

In one embodiment, the alternate bed moving apparatus 900 includes an electrically activated linear actuator 910. The linear actuator 910 includes a first end 910A and a second end 910B. The first end 910A of the linear actuator 910 is rotatably coupled to the fixed plate 902, and the second end 910B of the linear actuator 910 is rotatably coupled to the rotating plate 904. The electrically activated linear actuator 910 includes a housing 912 and a piston 914 within the housing 912 that extends outward from the housing 912 as the bed frame 106 moves to the vertical position, and that contracts into the housing 912 as the bed frame 106 moves to the horizontal position. The linear actuator 910, in one embodiment, is substantially similar to the linear actuator 710 of the bed moving apparatus 700 of FIGS. 7A-7C. For example, the linear actuator 710 may have a worm gear, a reversible electric motor, etc.

In one embodiment, the linear actuator 910 is connected to the rotating plate 904 at a position that is horizontally offset from the first pivot point 906 at a location such that the second end of the second lever arm 920 is attached to the rotating plate 904 between the location that the second end 910B of the linear actuator 910 is connected to the rotating plate 904 and the first pivot point 906. In another embodiment, the first end 910A of the linear actuator 910 is connected to the fixed plate 902 at a position that is horizontally offset from a vertical line 934 extending through the first pivot point 906 at a location such that the first end 908A of the gas spring 908 is attached to the fixed plate 902 between the location that the first end 910A of the linear actuator 910 is connected to the fixed plate 902 and the vertical line 934. As with the bed moving apparatus 700 of FIGS. 7A, 7B, and 7C, offsetting the linear actuator 910 may allow the alternate bed moving apparatus 900 to fit in the bed cabinet 108. Also, the second end 910B of the linear actuator 910 may be connected to the rotating plate 904 at a location vertically offset from a horizontal line 936 running along the bed frame 106 and through the first pivot point 906 when the bed frame 106 is in the horizontal position.

In another embodiment, a user provides a force to move the bed frame 106 from the vertical position to the horizontal position and back to the vertical position. In another embodiment, the alternate bed moving apparatus 900 includes a motor (not shown) that moves the bed frame 106 from the vertical position to the horizontal position and back. For example, the motor may be coupled to the bed frame through gears, through gears and a chain, through gears and a belt, or the like. In another embodiment, the alternate bed moving apparatus 900 includes a pneumatic pump with appropriate pistons, tubing, etc. to move the bed frame 106 from the vertical position to the horizontal position and back. One of skill in the art will recognize other means to move the bed frame 106 from the vertical position to the horizontal position and back.

Figure 10A:
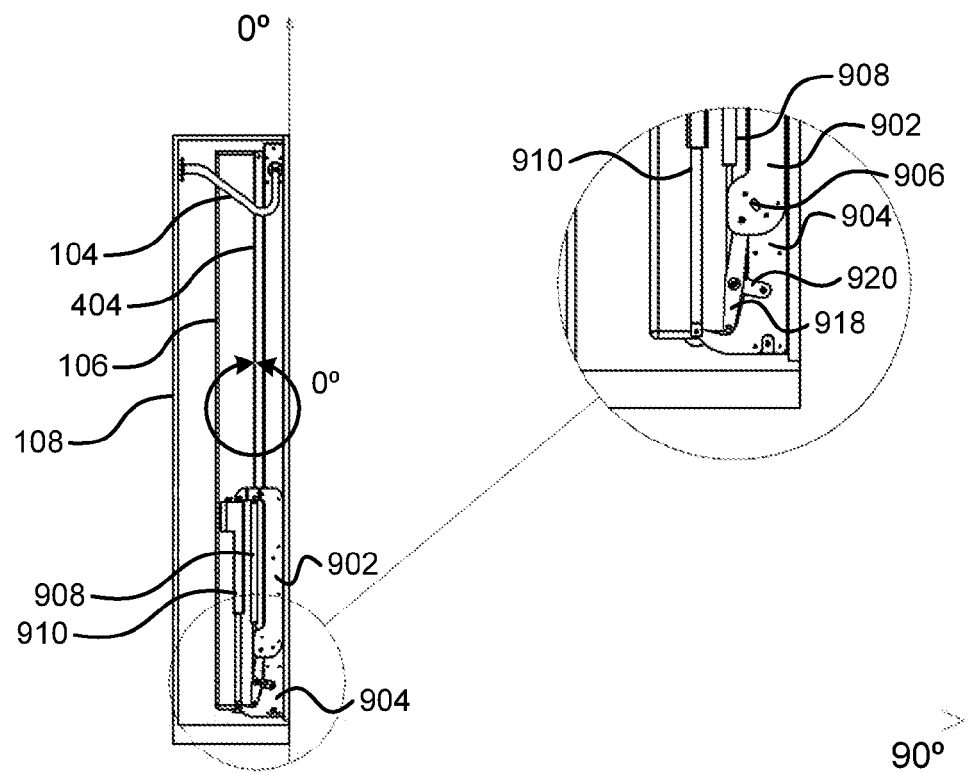
FIG. 10A is a side view of the embodiment of the alternate bed moving apparatus in a vertical position.
Figure 10B:
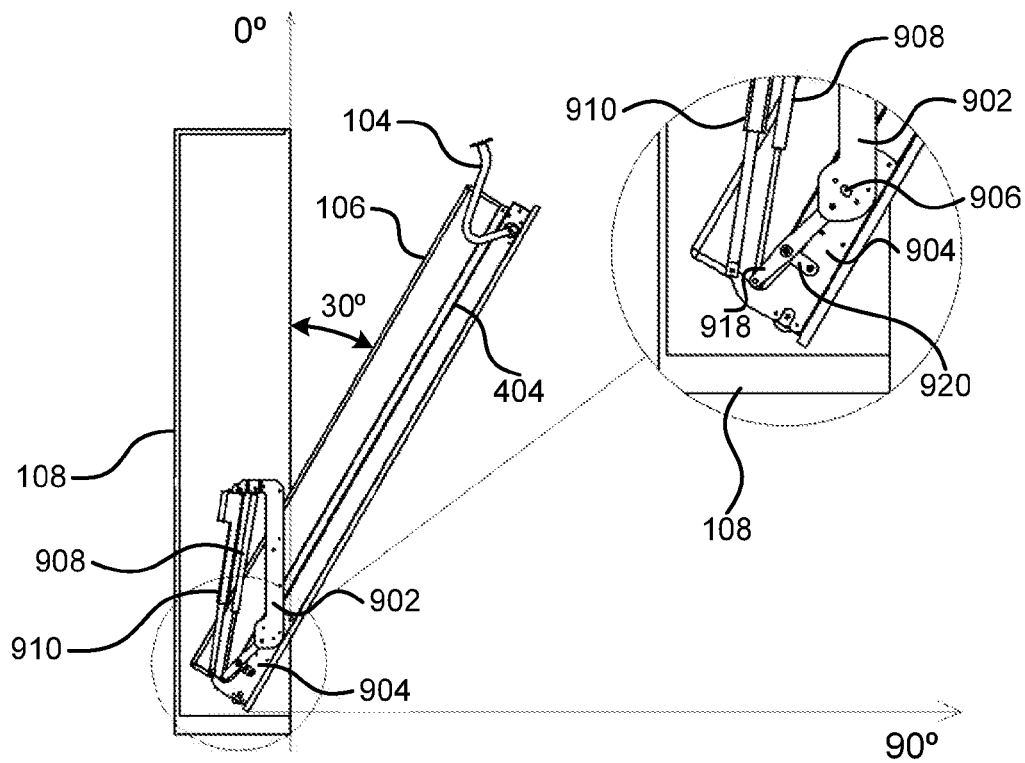
FIG. 10B is a side view of the embodiment of the alternate bed moving apparatus in a 30 degree position.
Figure 10C:
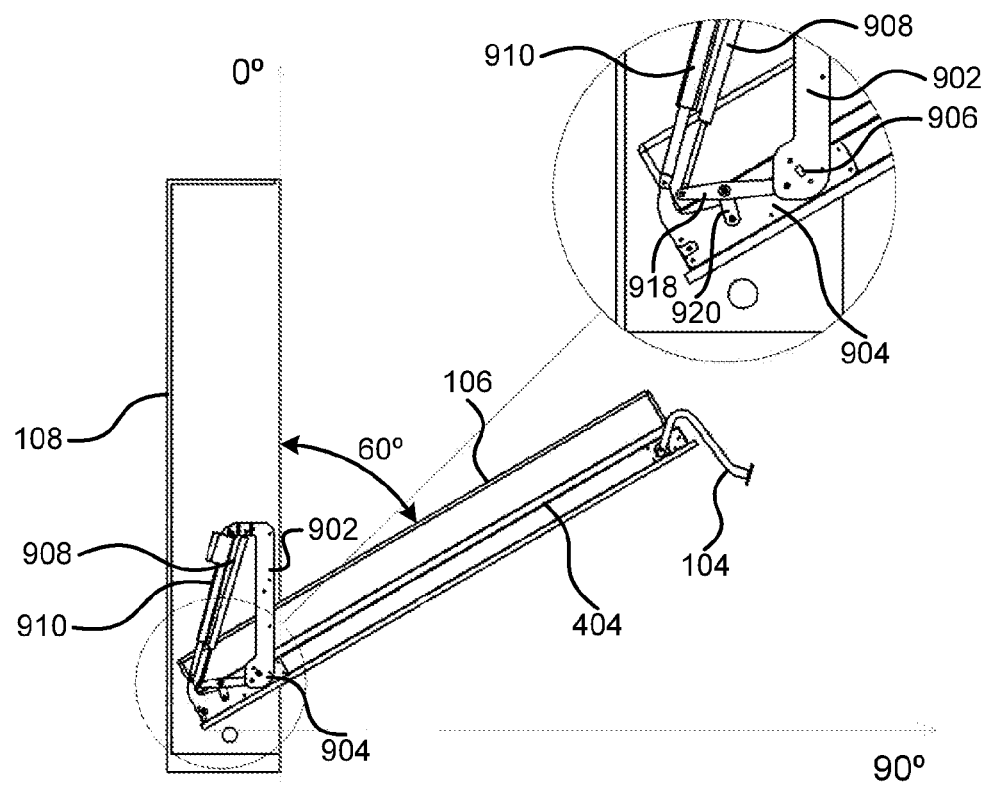
FIG. 10C is a side view of the embodiment of the alternate bed moving apparatus in a 60 degree position.
Figure 10D:
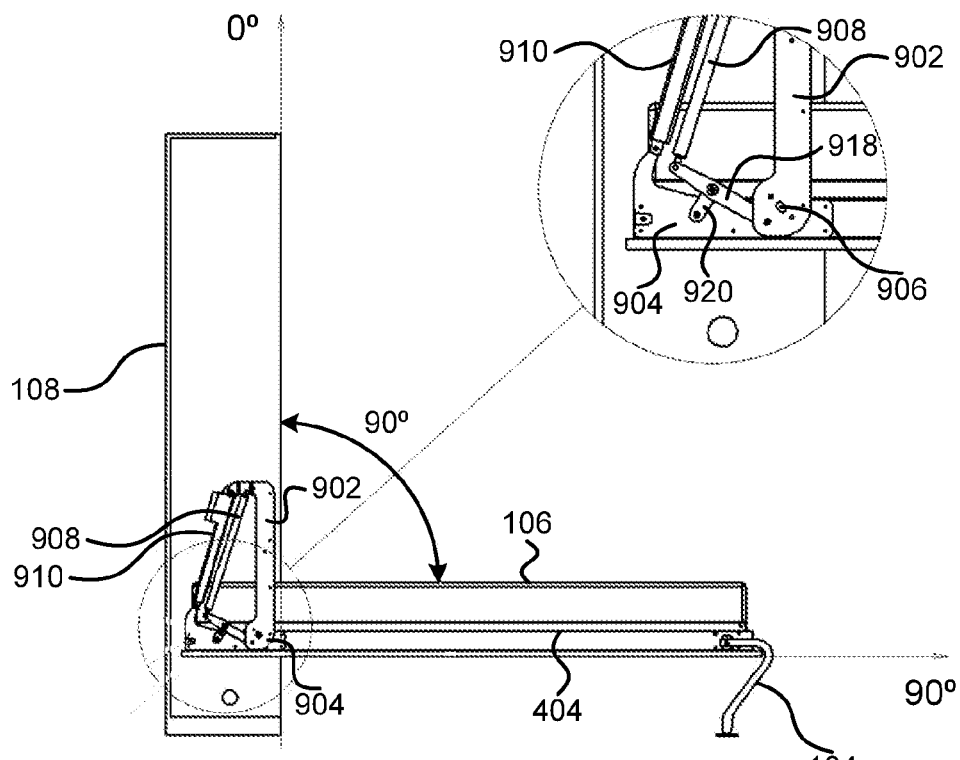
FIG. 10D is a side view of the embodiment of the alternate bed moving apparatus in a horizontal position.

FIG. 10A is a side view of the embodiment of the alternate bed moving apparatus 900 in a vertical position, FIG. 10B is a side view of the embodiment of the alternate bed moving apparatus 900 in a 30 degree position, FIG. 10C is a side view of the embodiment of the alternate bed moving apparatus 900 in a 60 degree position, and FIG. 10D is a side view of the embodiment of the alternate bed moving apparatus 900 in a horizontal position. FIGS. 10A-10D include a fixed plate 902, a rotating plate 904, a first pivot point 906, a gas spring 908, a linear actuator 910 with a housing 912, a piston (not shown), a motor 916, a first lever arm 918, and a second lever arm 920 substantially similar to those described in relation to the alternate bed moving apparatus 900 of FIGS. 9A-9C. FIGS. 10A-10D demonstrate how the first lever arm 918 and second lever arm 920 move as the bed frame 106 moves from vertical to horizontal.

Figure 11:
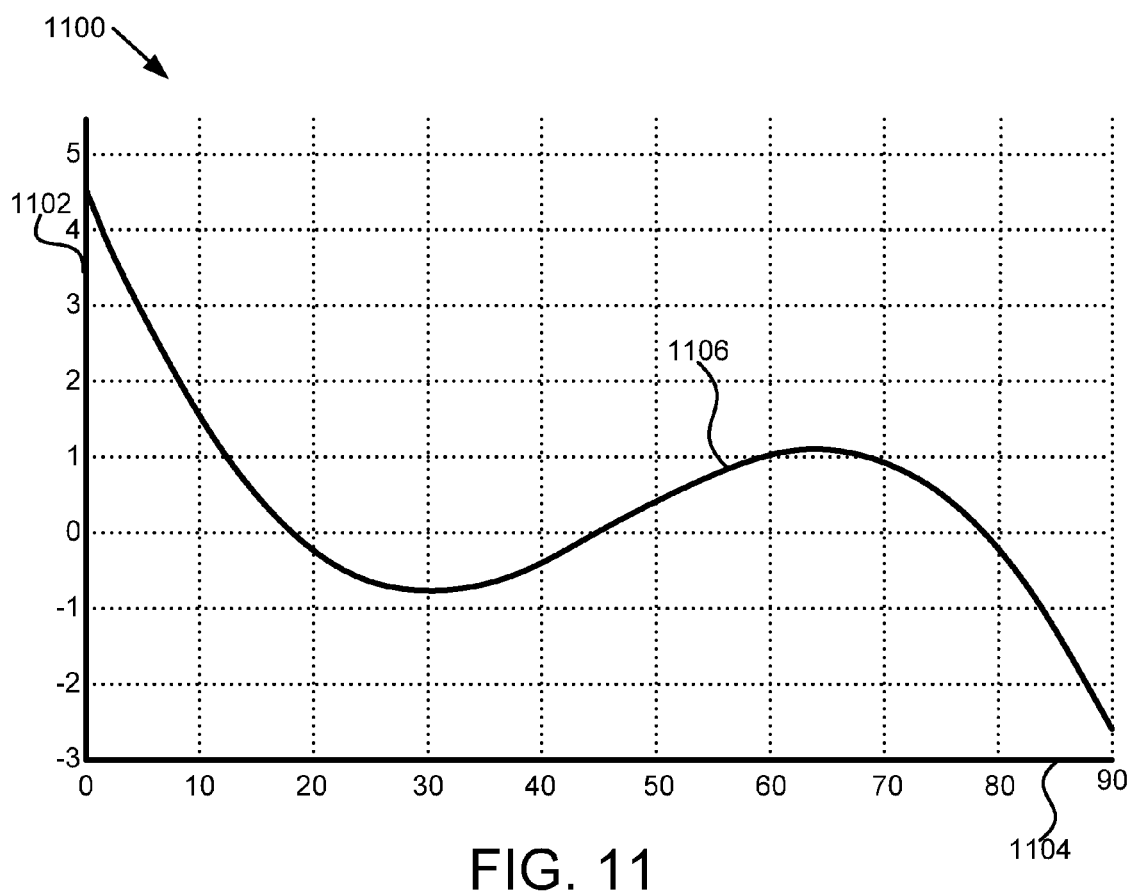
FIG. 11 a graph of forces on the embodiment of the alternate bed moving apparatus.

FIG. 11 a graph 1100 of forces on the embodiment of the alternate bed moving apparatus. The vertical axis 1102 is force in kilograms and horizontal axis 1104 is an angle of rotation of the bed frame 106 relative to the bed cabinet 108 where zero degrees represents the bed frame 106 in the vertical position. The line 1106 on the graph 1100 represents the difference between the weight of the bed frame 106 at the end of the bed frame 106 away from the first pivot point 906 and an opposing force produced by the gas spring 908 as the bed frame 106 is lowered to the horizontal position, which corresponds to 90 degrees on the graph 1100. This line 1106 in the graph 1100 may be compared to the bottom line 810 of the graph 800 of FIG. 8. Note that the force required to lower the bed frame 106, as shown by the line 1106 on the graph 1100 is much smaller than the 20 kg required by the bed moving apparatus 700 and shown by the bottom line 810 of the graph 800 in FIG. 8. The amount of force required to lower the bed frame 106 varies between about 4.5 kg at vertical and −2.5 kg at horizontal. The relatively low force requirement of the alternate bed moving apparatus 900 is advantageous to reduce the amount of force applied by a user or by another source, such as the linear actuator 910.

In one embodiment, the alternate bed moving apparatus 900 is designed so that the length of the first lever arm 918, the length of the second lever arm 920, and the second pivot point 922 where the first end of the second lever arm 920 is coupled to the first lever arm 918 are chosen to provide an upward force between a vertical position and a position of about 15 degrees from vertical, a substantially balanced force between about 15 degrees from vertical to about 80 degrees from vertical, and a downward force between about 80 degrees from vertical to the horizontal position. In the embodiment, providing an upward force (i.e. a force moving the bed frame 106 to the vertical position) from vertical to about 15 degrees from vertical beneficially provides a force to keep the bed frame in the vertical position when the bed frame 106 is between vertical and about 15 degrees of vertical. In other embodiments, the alternate bed moving apparatus 900 may be designed to provide a vertical force for other angles from vertical, such as 20 degrees, 25 degrees, 30 degrees, etc.

Also, beneficially, having downward force from about 80 degrees from vertical to the horizontal position (i.e. 90 degrees from vertical) provides a force that allows the bed frame to return to the horizontal position when lifted a small amount, or up to about 80 degrees from vertical. In other embodiments, the alternate bed moving apparatus 900 may be designed with a downward force for other angles, such as 75 degrees from vertical, 70 degrees from vertical, etc. Also, beneficially the alternate bed moving apparatus 900 includes a substantially balanced force between about 15 degrees from vertical to about 80 degrees from vertical. Hereinafter, a "balanced force" is a neutral force where the bed frame 106 would not move up or down or a relatively small upward or downward force. For example, as FIG. 11 indicates, there is a force of less than about 1 kg in a downward direction and less than about 1.1 kg in an upward direction in the range of about 15 degrees to about 80 degrees. Other embodiments of the alternate bed moving apparatus 900 may include other maximum upward and downward force limits over middle range of motion of a bed frame 106. Beneficially, the alternate bed moving apparatus 900 of FIGS. 9A, 9B, and 9C may allow use of a smaller or less powerful linear actuator 910 than the bed moving apparatus 700 of FIGS. 7A, 7B, and 7C.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. A bed moving apparatus comprising:
a fixed plate mounted on a vertical wall of a bed cabinet;
a rotating plate rotatably coupled to the fixed plate at a first pivot point, the rotating plate mounted to a bed frame, wherein when the bed frame is in a vertical position the rotating plate is approximately parallel to the fixed plate, and when the bed frame is in a horizontal position the rotating plate is approximately perpendicular to the fixed plate;

a first lever arm comprising a first end and a second end, the first end of the first lever arm rotatably coupled to the fixed plate;

a second lever arm comprising a first and a second end, the first end of the second lever arm rotatably coupled to the first lever arm at a point between the first end and the second end of the first lever arm, and the second end of the second lever arm rotatably coupled to the rotating plate at a position that is offset a first horizontal distance from the first pivot point; and a gas spring with a first end and a second end, the first end of the gas spring rotatably coupled to the fixed plate and the second end of the gas spring rotatably coupled to the second end of the first lever arm, the gas spring opposing a gravitational force acting on the bed frame as the bed frame moves from the horizontal position to the vertical position.

2. The bed moving apparatus of claim 1, further comprising an electrically activated linear actuator with a first end and a second end, the first end of the linear actuator rotatably coupled to the fixed plate, and the second end of the linear actuator rotatably coupled to the rotating plate, the electrically activated linear actuator comprising a housing and a piston within the housing that extends outward from the housing as the bed frame moves to the horizontal position, and that contracts into the housing as the bed frame moves to the vertical position.

3. The bed moving apparatus of claim 2, wherein the second end of the linear actuator is connected to the rotating plate at a position that is horizontally offset from the first pivot point at a location such that the second end of the second lever arm is attached to the rotating plate between the location that the second end of the linear actuator is connected to the rotating plate and the first pivot point.

4. The bed moving apparatus of claim 2, wherein the first end of the linear actuator is connected to the fixed plate at a position that is horizontally offset from a vertical line extending through the first pivot point at a location such that the first end of the gas spring is attached to the fixed plate between the location that the first end of the linear actuator is connected to the fixed plate and the vertical line.

5. The bed moving apparatus of claim 4, wherein the second end of the linear actuator is connected to the rotating plate at a location vertically offset from a horizontal line running along the bed frame and through the first pivot point when the bed frame is in the horizontal position.

6. The bed moving apparatus of claim 2, wherein the linear actuator comprises a worm gear that moves the piston in and out of the housing of the linear actuator.

7. The bed moving apparatus of claim 2, wherein the linear actuator comprises a reversible electric motor that moves the piston of the linear actuator, the electric motor operating in a first direction moves the bed frame to the horizontal position and operating in a second direction moves the bed frame to the vertical position.

8. The bed moving apparatus of claim 1, wherein the second lever arm is coupled to the first lever arm at a second pivot point, the second pivot point offset such that the second pivot point is between a center of the first lever arm and the second end of the first lever arm.

9. The bed moving apparatus of claim 1, wherein the second lever arm is less than half the length of the first lever arm.

10. The bed moving apparatus of claim 1, wherein the length of the first lever arm, the length of the second lever arm, and a second pivot point where the first end of the second lever arm is coupled to the first lever arm are chosen to provide:

an upward force between a vertical position and a position of about 15 degrees from vertical;

a substantially balanced force between about 15 degrees from vertical to about 80 degrees from vertical; and a downward force between about 80 degrees from vertical to the horizontal position.

11. The bed moving apparatus of claim 1, wherein the first end of the first lever arm is rotatably coupled to the fixed plate at a first distance from the first pivot point.

12. The bed moving apparatus of claim 1, wherein the first end of the gas spring is rotatably coupled to the fixed plate at a third pivot point and the third pivot point positioned a vertical distance above the first pivot point.

13. A bed moving apparatus comprising:
a fixed plate mounted on a vertical wall of a bed cabinet;
a rotating plate rotatably coupled to the fixed plate at a first pivot point, the rotating plate mounted to a bed frame, wherein when the bed frame is in a vertical position the rotating plate is approximately parallel to the fixed plate, and when the bed frame is in a horizontal position the rotating plate is approximately perpendicular to the fixed plate;
a gas spring with a first end and a second end, the first end of the gas spring rotatably coupled to the fixed plate, and the second end of the gas spring rotatably coupled to the rotating plate, the gas spring opposing a gravitational force acting on the bed frame as the bed frame moves from the horizontal position to the vertical position; and
an electrically activated linear actuator with a first end and a second end, the first end of the linear actuator rotatably coupled to the fixed plate, the second end of the linear actuator rotatably coupled to the rotating plate, the electrically activated linear actuator comprising:
a housing; and
a piston within the housing that extends outward from the housing as the bed frame moves to a vertical position, and that contracts into the housing as the bed frame moves to a horizontal position.

14. The bed moving apparatus of claim 13, wherein the gas spring is positioned approximately parallel to the linear actuator.

15. The bed moving apparatus of claim 13, further comprising:
a first lever arm comprising a first end and a second end, the first end of the first lever arm rotatably coupled to the fixed plate; and
a second lever arm comprising a first and a second end, the first end of the second lever arm rotatably coupled to the first lever arm at a point between the first end and the second end of the first lever arm, and the second end of the second lever arm rotatably coupled to the rotating plate at a position that is offset a first horizontal distance from the first pivot point,
wherein the second end of the gas spring is rotatably coupled to the second end of the first lever arm.

16. The bed moving apparatus of claim 15, wherein the second end of the linear actuator is connected to the rotating plate at a position that is horizontally offset from the first pivot point at a location such that the second end of the second lever arm is attached to the rotating plate between the location that the second end of the linear actuator is connected to the rotating plate and the first pivot point.

17. The bed moving apparatus of claim 15, wherein the first end of the linear actuator is connected to the fixed plate at a position that is horizontally offset from a vertical line extending through the pivot point at a location such that the first end of the gas spring is attached to the fixed plate between the location that the first end of the linear actuator is connected to the fixed plate and the vertical line.

18. The bed moving apparatus of claim 13, wherein the linear actuator comprises a worm gear that moves the piston in and out of the housing of the linear actuator and wherein the linear actuator comprises a reversible electric motor that moves the piston of the linear actuator, the electric motor operating in a first direction moving the bed frame to the horizontal position and operating in a second direction moving the bed frame to the vertical position.

19. A bed moving system comprising:
a bed cabinet for a wall bed;
a bed frame of the wall bed;
a fixed plate mounted on a vertical wall of the bed cabinet;
a rotating plate rotatably coupled to the fixed plate at a first pivot point, the rotating plate mounted to the bed frame, wherein when the bed frame is in a vertical position the rotating plate is approximately parallel to the fixed plate, and when the bed frame is in a horizontal position the rotating plate is approximately perpendicular to the fixed plate;
a first lever arm comprising a first end and a second end, the first end of the first lever arm rotatably coupled to the fixed plate;
a second lever arm comprising a first and a second end, the first end of the second lever arm rotatably coupled to the first lever arm at a point between the first end and the second end of the first lever arm, and the second end of the second lever arm rotatably coupled to the rotating plate at a position that is offset a first horizontal distance from the first pivot point; and
a gas spring with a first end and a second end, the first end of the gas spring rotatably coupled to the fixed plate and the second end of the gas spring rotatably coupled to the second end of the first lever arm, the gas spring opposing a gravitational force acting on the bed frame as the bed frame moves from the horizontal position to the vertical position.

20. The bed moving system of claim 19, further comprising:
an electrically activated linear actuator with a first end and a second end, the first end of the linear actuator rotatably coupled to the fixed plate, and the second end of the linear actuator rotatably coupled to the rotating plate, the electrically activated linear actuator comprising a housing and a piston within the housing that extends outward from the housing as the bed frame moves to the horizontal position, and that contracts into the housing as the bed frame moves to the vertical position; and
a reversible electric motor coupled to the piston, wherein the electric motor operating in a first direction moves the bed frame to the horizontal position and operating in a second direction moves the bed frame to the vertical position.

* * * * *